(12) United States Patent
Meadows et al.

(10) Patent No.: US 11,717,721 B2
(45) Date of Patent: *Aug. 8, 2023

(54) GOLF SHOT TRACKING SYSTEM

(71) Applicants: James W. Meadows, Madison, MS (US); Richard L. Root, Ridgeland, MS (US); Richard C. Edmonson, Ridgeland, MS (US)

(72) Inventors: James W. Meadows, Madison, MS (US); Richard L. Root, Ridgeland, MS (US); Richard C. Edmonson, Ridgeland, MS (US)

( * ) Notice: Subject to any disclaimer, the term of this patent is extended or adjusted under 35 U.S.C. 154(b) by 236 days.

This patent is subject to a terminal disclaimer.

(21) Appl. No.: 17/080,587

(22) Filed: Oct. 26, 2020

(65) Prior Publication Data

US 2021/0170226 A1 Jun. 10, 2021

Related U.S. Application Data

(63) Continuation of application No. 16/143,134, filed on Sep. 26, 2018, now Pat. No. 11,045,688, which is a continuation of application No. 14/194,072, filed on Feb. 28, 2014, now abandoned.

(51) Int. Cl.
| | |
|---|---|
| A63B 24/00 | (2006.01) |
| A63B 71/06 | (2006.01) |
| G09B 19/00 | (2006.01) |
| A63B 69/36 | (2006.01) |
| A63B 55/00 | (2015.01) |

(52) U.S. Cl.
CPC .......... *A63B 24/0003* (2013.01); *A63B 69/36* (2013.01); *A63B 71/0619* (2013.01); *A63B 71/0669* (2013.01); *G09B 19/0038* (2013.01); *A63B 69/3605* (2020.08); *A63B 2055/402* (2015.10); *A63B 2071/0691* (2013.01); *A63B 2220/12* (2013.01); *A63B 2220/16* (2013.01); *A63B 2220/40* (2013.01); *A63B 2225/50* (2013.01); *A63B 2225/54* (2013.01)

(58) Field of Classification Search
CPC . A63B 24/0003; A63B 69/36; A63B 71/0619; A63B 71/0669; G09B 19/0038
See application file for complete search history.

(56) References Cited

U.S. PATENT DOCUMENTS

| | | | | |
|---|---|---|---|---|
| 5,728,006 A | * | 3/1998 | Teitell | A63B 69/3614 473/151 |
| 2003/0207718 A1 | * | 11/2003 | Perlmutter | A63B 69/3632 473/221 |

(Continued)

*Primary Examiner* — William H McCulloch, Jr.
*Assistant Examiner* — Ankit B Doshi
(74) *Attorney, Agent, or Firm* — Olivo IP Law Group P.C.; John W. Olivo, Jr.

(57) ABSTRACT

A golf tracking system including a tag coupled to a golf club. The tag includes a plurality of sensors, each which output a signal based on a detected movement of the golf club, a microcontroller that compares each of the plurality of sensor outputs to stored reference sensor output values, and a transceiver that transmits data corresponding to the sensor outputs to a device remote from the tag based on the comparison performed by the microcontroller. The location-aware device then processes the information received from the tag to determine whether a shot should be registered.

20 Claims, 22 Drawing Sheets

(56) References Cited

U.S. PATENT DOCUMENTS

| | | | | |
|---|---|---|---|---|
| 2006/0029916 | A1* | 2/2006 | Boscha | A63B 69/3614 434/252 |
| 2007/0232405 | A1* | 10/2007 | Halleck | A63B 69/3632 473/220 |
| 2010/0113174 | A1* | 5/2010 | Ahern | A63B 71/0669 700/91 |

\* cited by examiner

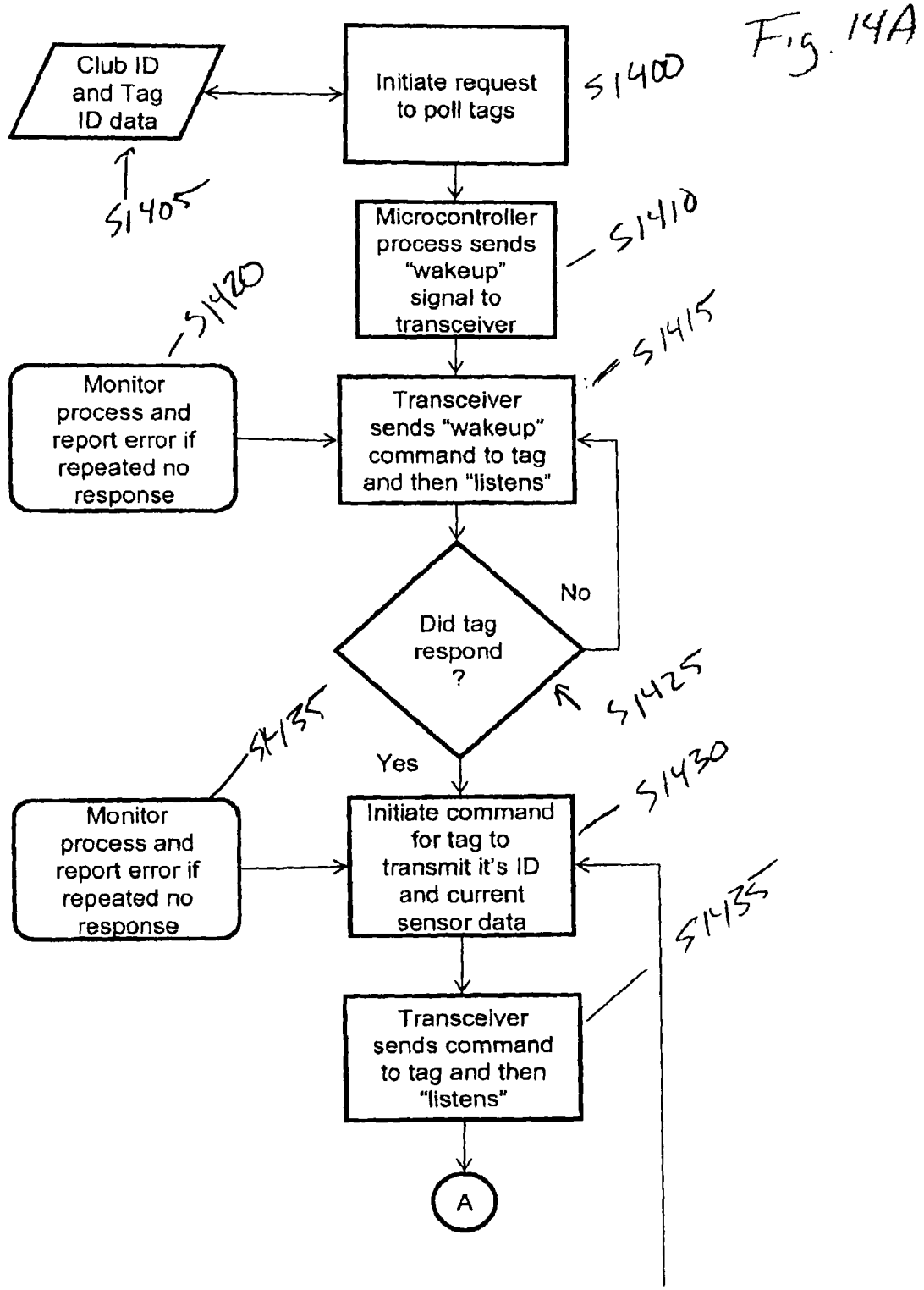

GOLF SHOT TRACKING SYSTEM

PRIORITY CLAIMS

This application is a continuation of U.S. patent application Ser. No. 16/143,134, filed Sep. 26, 2018, which is a continuation of U.S. patent application Ser. No. 14/194,072, filed Feb. 28, 2014, which is a National Stage Entry of PCT Application Serial No. PCT/US2010/055837, filed Nov. 8, 2010, which claims the benefit of U.S. Provisional Application Ser. No. 61/258,967, filed Nov. 6, 2009, the entire contents of which are incorporated herein by reference.

BACKGROUND OF THE INVENTION

1. Field of the Invention

The present invention relates to a method and apparatus for detecting a golf shot by processing outputs of a plurality of sensors, and reporting the sensor outputs or an indication of a detected golf shot to a portable position-aware device, which then records the location of the golf shot in association with the position information.

2. Description of the Related Art

In the game in golf, it is essential for a player to have accurate distance measurements corresponding to a golf hole before taking a shot. For example, a player may wish to know the distance from his or her location to the front and back portions of a hazard, to the end of a fairway, to the front, middle and back portions of the green, etc. Previously, it was necessary for a player to estimate these distances by using markings on the course and/or a yardage book indicating distances between various points on the course.

Recently, however, the use of portable location-aware electronic devices has become common in the game of golf to ascertain distances from a player's current position to various features on the course. These location-aware devices are typically in the form of a handheld computing device, which may be capable of displaying an outline of a golf hole and distances from the location-aware device to the various features on the golf hole. These devices are also configured to allow a player to manually enter and track various statistics related to a round of golf. For example, the player may manually enter a hole-by-hole score into the location-aware device, manually record a location of a shot, manually record a club used for a particular shot, etc.

The drawback to tracking statistics using these devices, however, is that the user must manually enter these statistics. Thus, in order to track a round shot-by-shot, for example, the player must manually enter data in to the device each time a shot is taken. Such a process is time-consuming, distracting, and takes away from a player's enjoyment of the round of golf.

SUMMARY OF THE INVENTION

In view of the above noted shortcomings in manually tracking statistics in a portable location-aware device, the inventors derived a system that allows for statistics to be automatically input into the location-aware device.

More particularly, the present invention is directed to a configuration in which a golf shot is automatically detected and stored in the location-aware device without the need for user intervention. In one exemplary embodiment, the configuration includes a tag coupled to a golf club and including a plurality of sensors, each configured to output a signal based on a detected movement of the golf club, a microcontroller configured to compare each of the plurality of sensor outputs to stored reference sensor output values, and a transceiver configured to transmit data corresponding to the sensor outputs to the location-aware device based on the comparison performed by the microcontroller. The location-aware device then processes the information received from the tag to determine whether a shot should be registered.

BRIEF DESCRIPTION OF THE DRAWINGS

The drawing figures depict one or more implementations in accord with the present invention, by way of example only, not by way of limitations. In the figures, like reference numerals refer to the same or similar elements. The description may be better understood when read in connection with the accompanying drawings, of which:

FIG. 14A-14B is a flow chart showing an exemplary process of actively retrieving information from the tags by the location-aware device;

DESCRIPTION OF THE PREFERRED EMBODIMENTS

An exemplary embodiment of the present invention will be described below with reference to the drawings.

Figure 1:
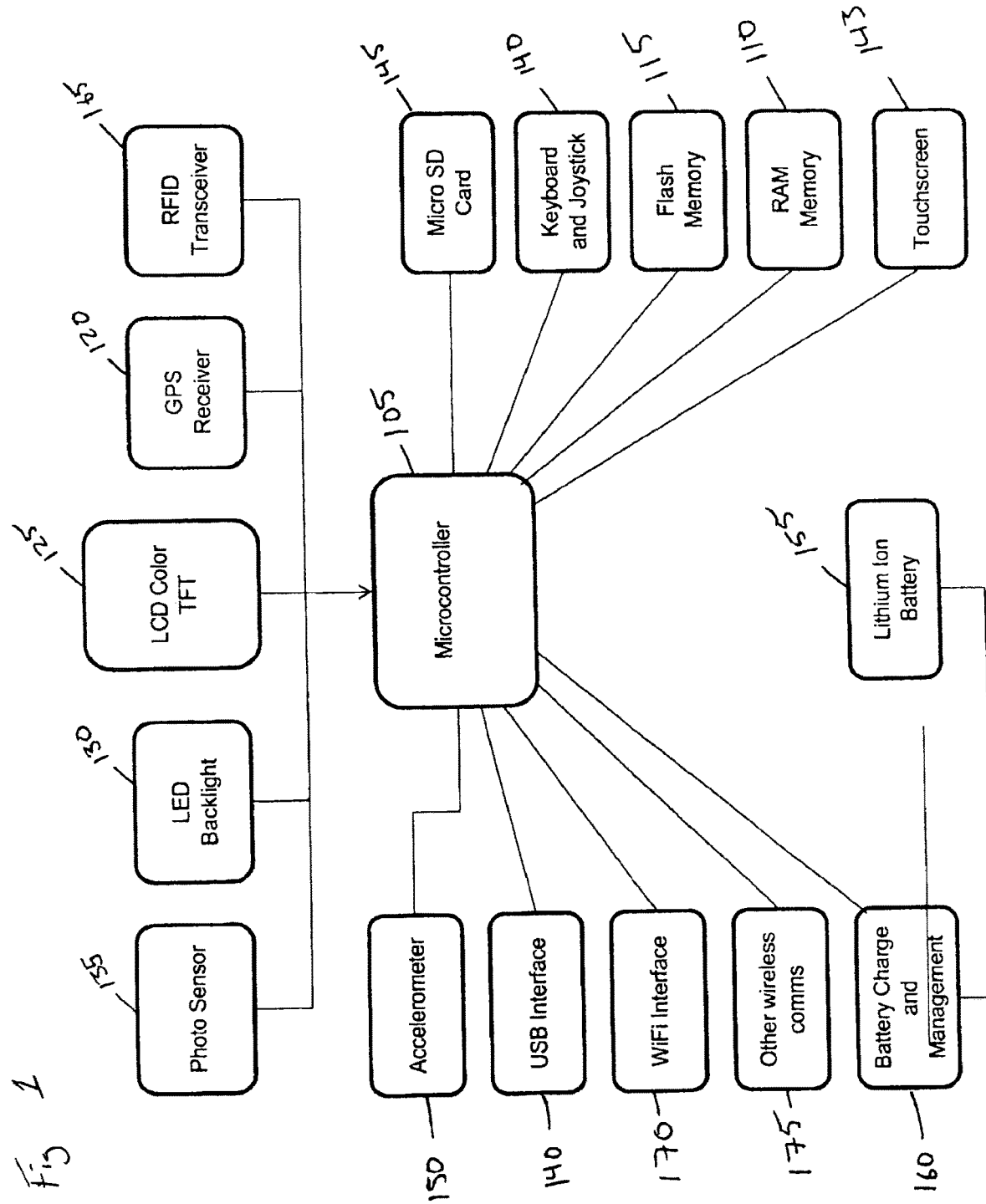
FIG. 1 is a block diagram showing an exemplary hardware configuration of a location-aware device.

FIG. 1 is a block diagram showing an exemplary configuration of a location-aware portable device 100 that is used by a player to obtain golf course related distance information. The location-aware device 100 may be a handheld device including multiple components that are managed by microcontroller 105 running software stored in a flash memory 115 or random-access memory 110, for example.

The microcontroller 105 serves as an interface and controller for a plurality of hardware systems and device application systems of the location-aware device. In an exemplary embodiment, the primary purpose of the portable location-aware device 100 is to provide a golfer with distance information to various points on a green, to various targets and hazards on the golf course.

The distance information is provided to the user by referencing mapped data stored in the flash memory 110, for example, to real time Global Positioning System (GPS) position data acquired by an onboard GPS receiver 120. The microcontroller 105 processes the GPS data and derives calculations to the mapped points and various areas on the course. This information is then displayed to the player through a graphical user interface that includes, for example, a sunlight readable color thin-film transistor (TFT) liquid crystal display (LCD) display 125 having a light-emitting diode (LED) backlight 130. The LED backlight 130 is controlled by a photosensor 135 that measures ambient light and adjusts the brightness of the backlight accordingly. The LCD 125 is transflective so the backlight brightness is reduced when the unit is in sunlight and the brightness is increased when the unit is in low light conditions.

The microcontroller 105 also receives input from the player by a keypad and/or joystick 140. The user input may correspond to a command to move a cursor on the graphical user interface, a command to enter data, a command to select a particular course for display, etc. The location-aware device may also include a touch screen 143 that would be used by the player to enter information and/or otherwise control the location-aware device 200.

As noted above, the mapped course data may be stored in an onboard flash memory 115, which can be updated via connection of a Universal Serial Bus (USB) port 140, micro-Secure Digital (micro-SD) card 145, WiFi radio 170 or other wireless communications device 175. An operating system of the microcontroller 105 and various applications executed by the microcontroller 105 may also utilize the onboard RAM 110 for storage of temporary data.

An onboard accelerometer 150 determines an orientation of the unit and measures acceleration along a vector. In one exemplary embodiment, the axis orientation and acceleration information is used by the microcontroller 105 to rotate the course data displayed via the graphical user interface to align with the player's orientation on a particular hole, for example.

The location-aware device is powered by a battery 115 that is managed by a charging circuit and power management circuit 160 to provide power to the various components of the location-aware device.

The location-aware device also includes a radio-frequency (RF) transceiver 165 that receives signals transmitted from the tags 200, described in detail below, which may transmit a club tag ID, tag battery status and other sensor data if the tag is in an operational state. The more specific details regarding the various states of the tags and the data transmitted from the tags are discussed in detail below.

Data transmitted from the tags is received by the RFID transceiver 165 of the location-aware device 100, and is processed by the microcontroller 105 to record an ID of the club being used, the current position of the location-aware device, club swing data and/or whether there is an indication of a ball strike with the golf club to which the tag is attached. This data is stored in a memory (e.g., flash memory 115 and/or RAM memory 110) and is used by the microcontroller 105 to automate the scoring process, remind the golfer if a club has been left behind, display the round and shot data graphically on the device, and to be available to upload the data to a computer and/or website for post-round analysis and graphical tracking of the player's golf shots over the course of a round.

Figure 2:
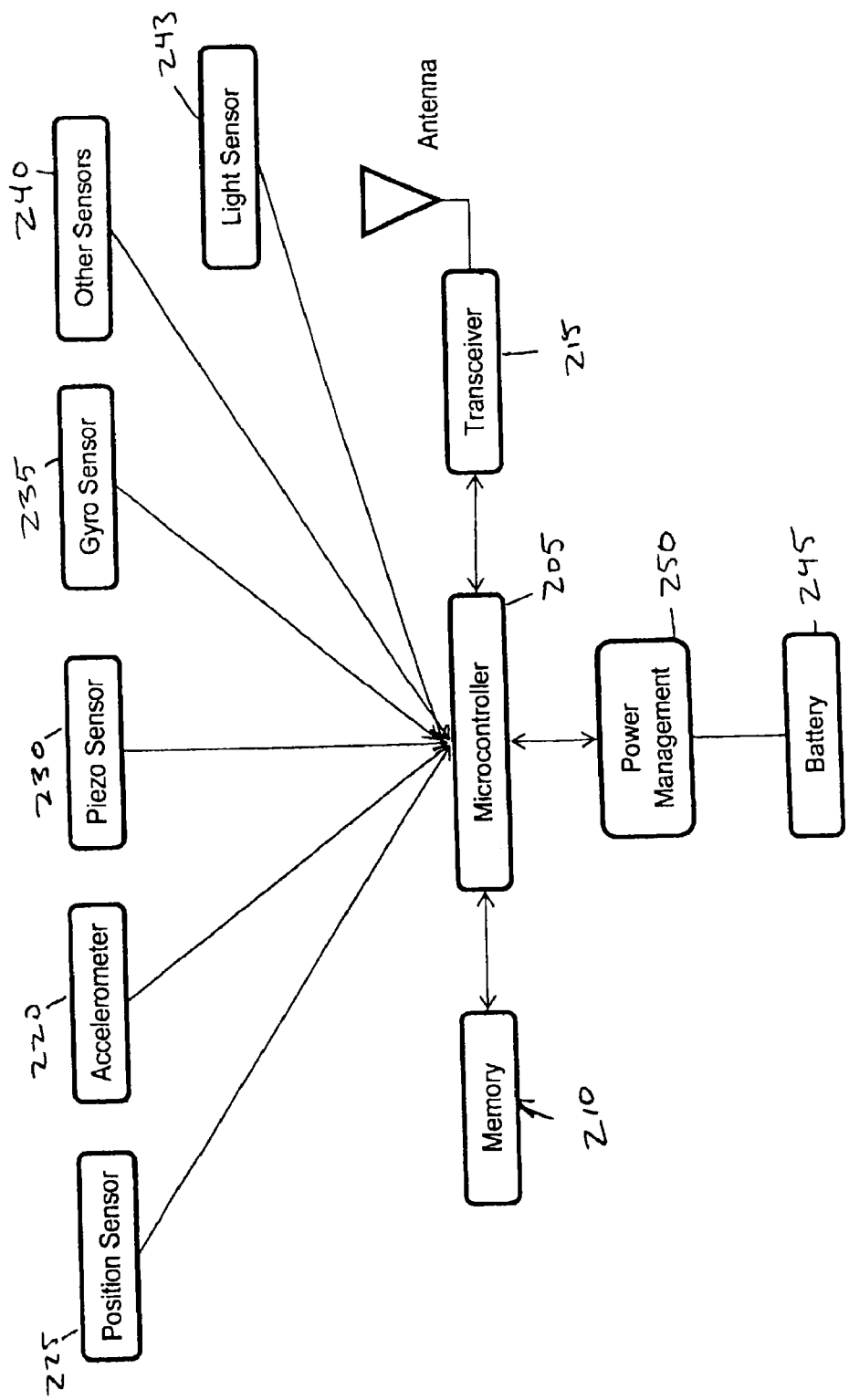
FIG. 2 is a block diagram showing an exemplary hardware configuration of a tag.

FIG. 2 is a block diagram showing an exemplary configuration of the hardware of an RFID tag 200 that is attached to a golf club, and is used to sense various forces applied to the club. The tag 200 includes a microcontroller 205 that executes applications stored in a memory 210 to processes outputs from various sensors of the tag 200 to either detect that a shot has been taken with the club, or relay raw data to the location-aware device 100, which then determines, based on the received data, that a shot has been taken with the club.

The tag 200 includes an RF transceiver 215 that communicates with the RF transceiver 165 of the location-aware device 165. In one exemplary embodiment, the RF transceiver 165 in the location-aware-device 100 and the RF transceiver 215 in the tag 200 are 2.4 GHz transceivers. However, while not described herein, various other short-range wireless transceiver arrangements may be implemented without departing from the scope of the present invention. Another function enabled with a transceiver on the tags would allow the tags to communicate with each other as an ad-hoc network and relay status and information through other tags to the receiving device.

The tag 200 also includes a plurality of solid state or micro-electro-mechanical (MEM) sensors that are used in the process of detecting whether a ball is struck by the golf club. Examples of these sensors will be described in more detail below.

In one exemplary embodiment, the tag includes an accelerometer 220 that senses vector motion pertaining to the club swing. The tag may also include a position sensor 225, which may be in the form of a tilt sensor, for example, that detects a vertical or horizontal orientation of the club. A piezo sensor 230 is also provided in the tag 200, and detects a rapid vibration event, such as the golf club making contact with a golf ball. Additionally, the tag 200 may include a gyro-sensor 235 that detects a rotational velocity and/or direction of the golf club to which the tag 200 is attached. The tag 200 may also include a light sensor 243, which detects an amount of light incident on the tag. As discussed in more detail below, this light sensor may be used to determine whether the club has be removed from, or returned to, a player's golf bag.

Certain electronic components can have functions that may be combined on to one chip and sensor package and serve multiple purposes. For example, the accelerometer 220 may be configured via software to also provide degree of tilt data in addition to acceleration data. This same electronic component may then be configured to also include a gyro sensor and a "tap" sensor effectively reducing the number of components needed on the tag circuit board. Optionally, the sensor components can be designed into a custom electronic chip that integrates all of the sensor functions of individual components. This would have the advantage of simplifying the circuitry on the tag and provide better power management and battery life on the tag.

The onboard microcontroller 205 processes and analyzes analog waveform or digital signal profile outputs from the sensors to determine if the output matches a pattern of data indicating a club swing and a ball strike. As discussed in further detail below, the outputs from each of the sensors may be compared against certain signal "signatures" and/or thresholds stored in the memory 210 to determine whether a ball strike event has occurred. These signatures, or pattern data, may be updated as the system learns what data indicates a ball strike and what data does not indicate a ball strike. In this manner, the tag 200 may self-learn over a period of time so as to increase the accuracy of detecting when a ball strike even occurs. The thresholds and parameters would be updated in the tag's memory via input through the tag transceiver. The data would be configured and sent by the location-aware device to optimize the tag sensor processing parameters.

Further, additional sensor data may be merged into an input to the microcontroller 205 to indicate club position and/or state and/or verify a ball strike and/or aid in the refinement of signal patterns indicating a ball strike. This other sensor data may be provided from additional sensors, such as a solid state accelerometer and/or shock sensors that output an indication of a shock event (ball strike) without the use of piezo sensors, and/or solid state or position sensors that indicate an orientation of the club. This additional sensor data could also be incorporated into the profile data patterns.

The components of the tag are powered by a battery 245, which is controlled by a power management circuit 250. The power management circuit 250 manages the power output from the battery 250 to the components of the tag 200, and is capable of reporting a status of the power remaining in the battery to the microcontroller 205.

A piezo vibration damper could be incorporated into the system to convert mechanical motion and vibration into electrical energy. If this is mounted internal to the grip and/or club shaft it would have the effect of dampening vibrations from striking the ball. The electrical energy would be stored in a capacitor and/or a battery. Typically a piezo device would be composed of a material having piezo-electric properties and incorporated on a flexible polymer substrate. The design of which would fit into the section of the club comprising the grip and/or comprising the internal section of the club shaft. Electrically it would be connected to a circuit that would capture and store the electrical energy derived from the mechanical and vibration motions of the club shaft.

The tag would ideally be a small format miniaturized circuit that is waterproof and ruggedized mounted to the end of the club grip or internal to the upper portion of the club shaft.

Figure 3:
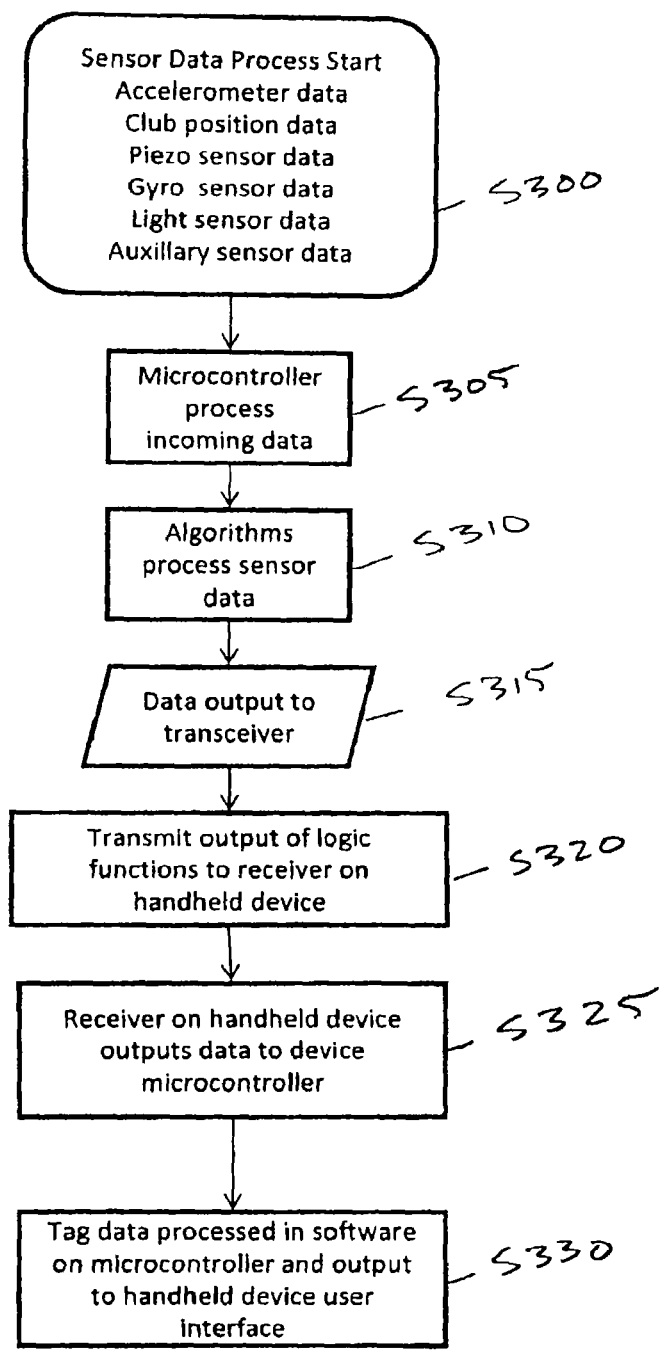
FIG. 3 is a flow chart outlining an exemplary process of detecting and processing motion dynamics of a club using the tag.

FIG. 3 is a flow chart outlining an overall process of detecting and processing motion dynamics of a club using the tag 200.

The process starts with the at S300 by collecting club dynamic motion data from one or more of the accelerometer 220, position sensor 225, piezo sensor 230 gyro sensor 235, light sensor 243 and any other sensors 240 included in the tag 200. The process of initializing an operation of the sensors will be described in greater detail below.

At S305 and S310 the microcontroller 205 of the tag 200 receives and process the data received by the plurality of sensors. In one exemplary embodiment, the microcontroller 205 may use filters and algorithm to remove extraneous noise and other events that could contribute to false indications of a ball strike event. This may be done by comparing the sensor data to a set of preliminary threshold values to eliminate erroneous detections. This process is discussed in more detail with reference to FIGS. 4A-4C.

The discussed in more detail below, the microcontroller 205 is configured to process the data received from the plurality of sensors, output the processed data to the transceiver 215, which then transits a signal to the transceiver 165 of the location-aware device S320 indicating that a ball strike event has been detected. In another exemplary embodiment, the microcontroller 205 is configured to control the transceiver 215 output motion dynamic data output from the sensors to the location-aware device 100. The microcontroller 105 at the location-aware device 100 then processes the received data to detect whether a ball strike event has occurred. This motion dynamic data may be raw data output by the sensors of the tag 200, or may be a processed form of sensor data that is processed by the microcontroller 205 before being output to the location-aware device 100. Once the transceiver 165 of the location-aware device I00 receives data from the tag 200, this data is output S325 to the microcontroller 105 of the location-aware device 100 for further processing. Regardless of the nature of the data output by the tag 200, the microcontroller 205 may also be configured to append additional data to the tag.

This additional data that is appended by the microcontroller 205 may be unique identification corresponding to the tag. This unique identification data may specifically identify a club (e.g., 5-iron, driver, club manufacturer, shaft length, weight, etc.), by the location-aware device transmitting that data to a memory location on the tag or it may be inserted to a memory location on the tag at manufacturer, or may be data unique to the tag 200 that is then associated with a specific club at the location-aware device. In the case that the identification data does not identify a specific club, a user may synchronize each of the tags before they are used by inputting data to the location-aware device that identifies a correspondence between the tag identification data and a club to which each respective tag is attached. Information included in the data transmitted from the tag 200 to the location-aware device 100 may also include information indicating a status of the battery 245 of the tag.

Upon receiving the data from the tag 200, the microcontroller 105 of the location-aware device 100 processes the received data S330, This processing may include, but is not limited to, associating a ball strike indication with OPS position data to record an identification of the club used to hit the ball at the current location of the location-aware device 100. This association of data may then be output at the graphical user interface of the location-aware device 100 to indicate that stroke has been taken with a specific club at the current location of the location-aware device. Such a configuration allows a shot to be automatically stored in the location-aware device I00 without any user intervention, thus simplifying a process of tracking a score and other statistics related to the round of golf using the location-aware device. As discussed above, other data may be associated with the transmission from the tag 200 to the location-aware device 100, such as club ID and/or motion dynamics and/or additional sensor data. The data is maintained in the location-aware device 100 to track a player's round and may be uploaded to a website or other data repository for analysis.

In one exemplary embodiment, the tag 200 transmits the raw sensor data directly to the location-aware device 100. The microcontroller 105 of the location-aware device 100 would then process the sensor data and compare it to data patterns stored in memory (e.g. flash memory 115 or RAM memory 110) that would indicate a ball strike and/or other club dynamics that would want to be further processed or displayed. The transceiver 215 of the tag 200 may also receive signals from the location-aware device 100 in order to "poll" and/or request information such as battery status from the tag on demand. This would enable a club inventory system to be implemented by the location-aware device 100 where the receiver tracks the status of the tag 200 and is able to process the dynamic state of the club. This process is discussed in more detail below with reference to FIGS. 14A-14B.

Figure 4A:
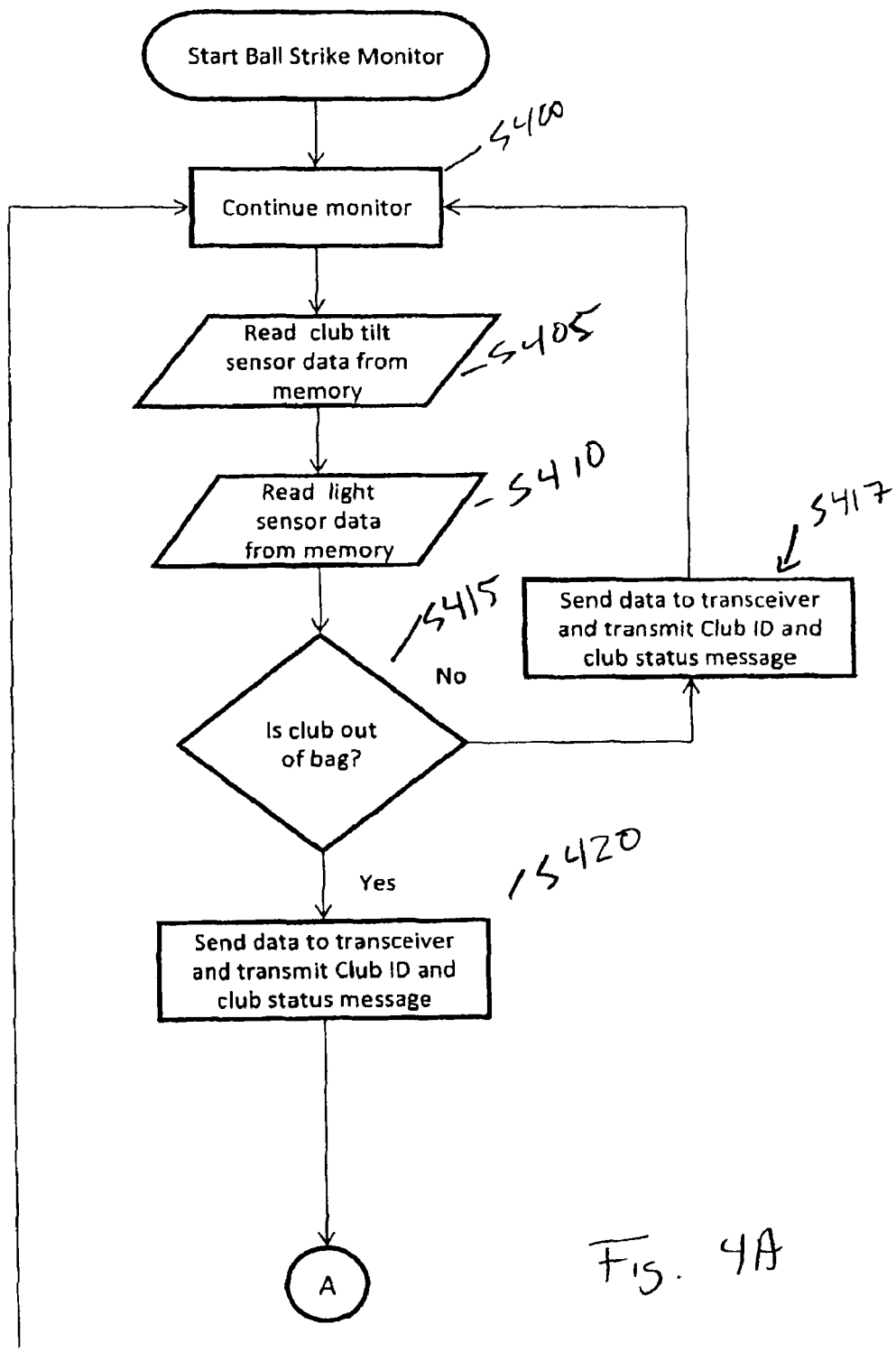
FIGS. 4A-4C depict a flow chart showing an exemplary flow of detecting a ball strike event using the various sensors located in the tag.
Figure 4B:
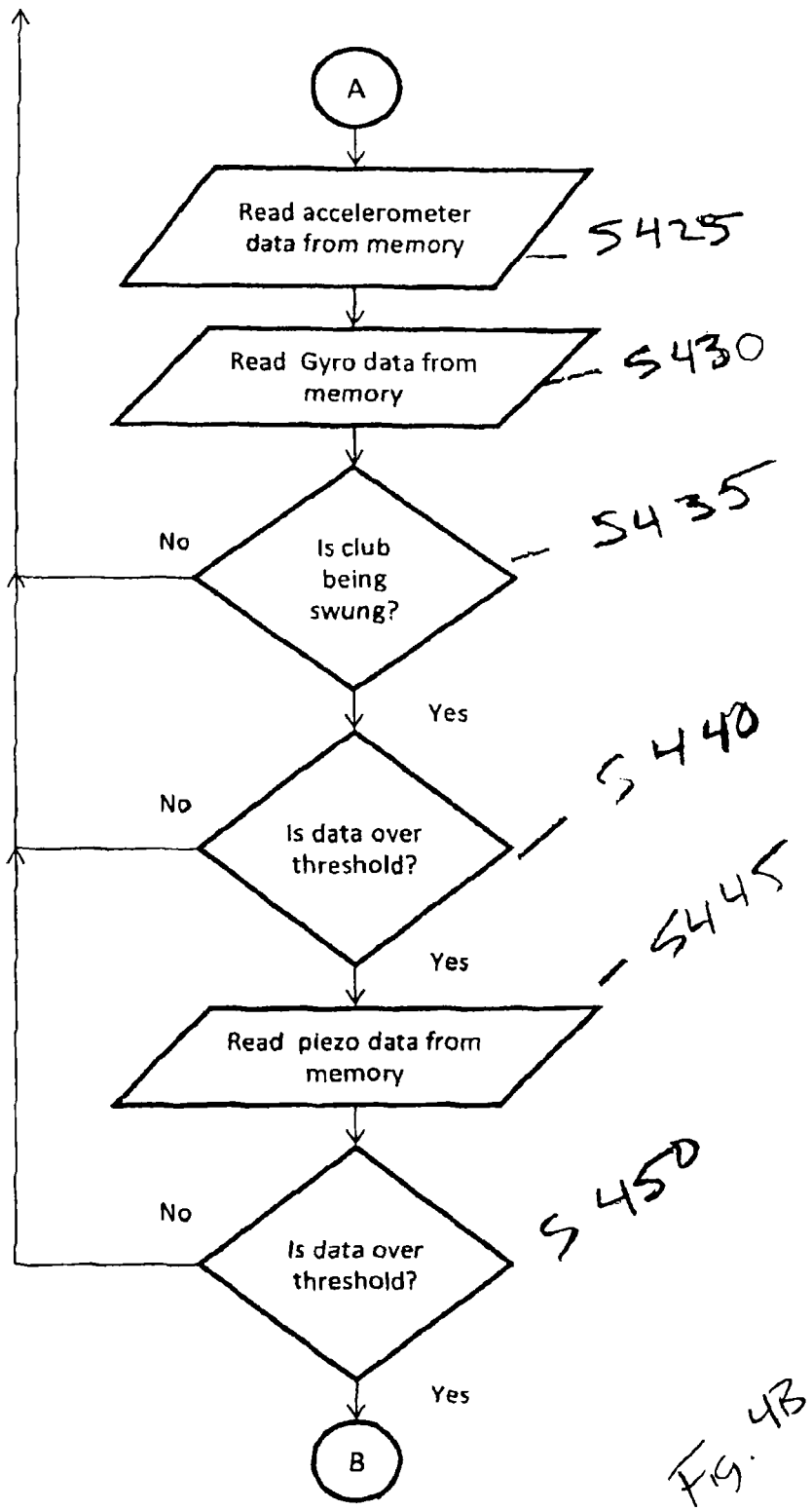
Figure 4C:
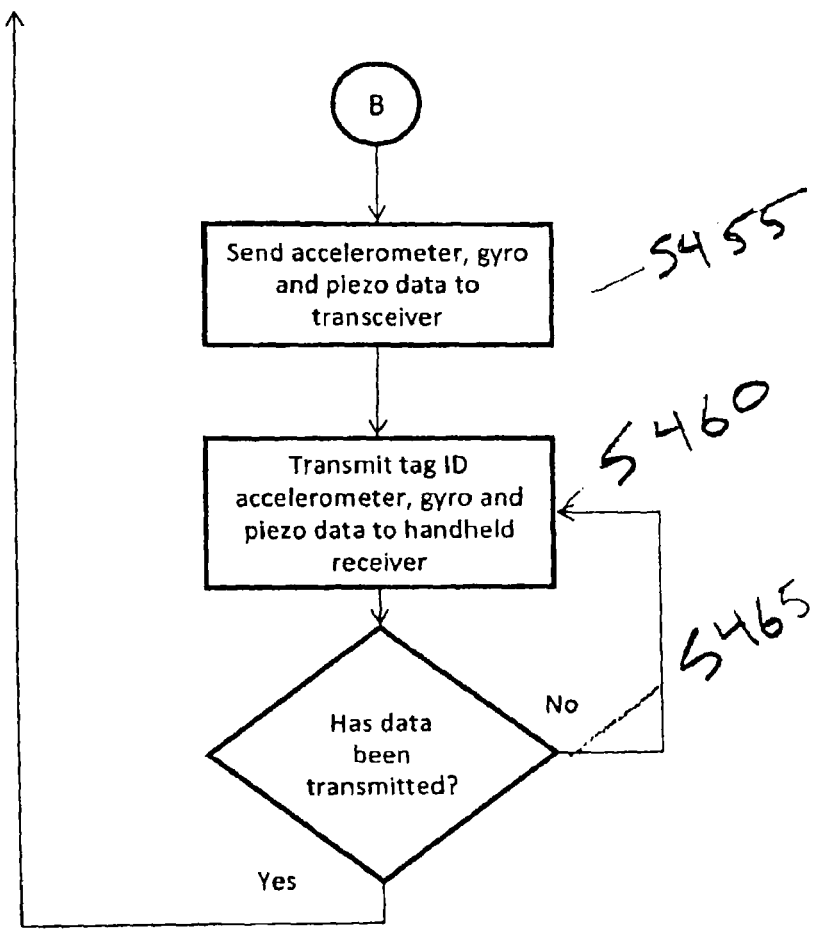

FIGS. 4A-4C is a flow chart showing a more detailed flow of detecting a ball strike event using the various sensors located in the tag 200. The process starts at S400 where the microcontroller 205 of the tag 200 may monitor a status of one or more sensors of the tag 200 to determine if the club has been removed from the player's bag. It is important to know when a tag is "at rest" and when it is in an "active" state so that data is not unnecessarily (e.g. continuously) transmitted from the tag 200 when the club is inactive. Such a determination also allows the microcontroller 205 to conserve power of the tag battery 245 by controlling the power management circuit 250 to reduce or eliminate power supplied from the battery 245 to the various components of the tag 200 when the club is not being used. The "at rest" and "active" determination is made by the microcontroller 205 of the tag 200 reading sensor data received from the microcontroller 205, which is stored in memory.

These sensor outputs reflect the removal of a golf club from a golf bag, thus indicating that the club is about to be used for a shot. On example of sensor data used to trigger the microcontroller 205 to begin a process of detecting a ball strike is club tilt data. The microcontroller 205 reads S405 the club tilt data stored in the memory 210 and determines that the club has gone from an inverted state to an upright state. Various sensor outputs, either individually or in combination, may be processed by the microcontroller in order to make a determination that the club is "active". Examples of these sensor outputs may include outputs of the position sensor 225, the accelerometer 220 and/or the gyro sensor 235.

Figure 5:
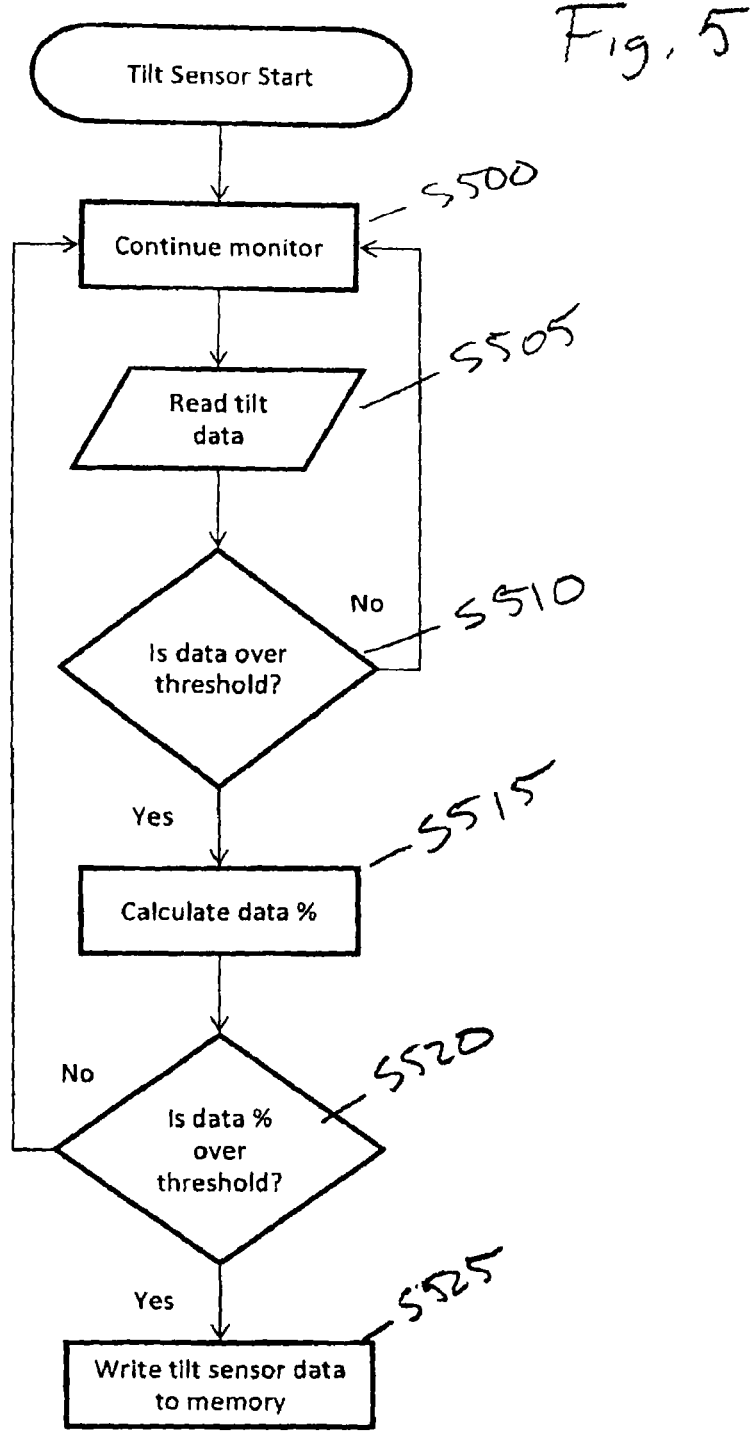
FIG. 5 is a flow chart depicting an exemplary process of acquiring and analyzing tilt sensor data.

An exemplary process flow of acquiring and analyzing the tilt sensor data is described in the flow chart shown in FIG. 5. As noted above, any one or a plurality of data from the position sensor 225, the accelerometer 220 and/or the gyro sensor 235 may be monitored S500 by the microcontroller S205 to determine if the club is in an active state. The microprocessor reads the tilt data S505 (e.g., the output of the one or more sensors used to detect tilt) and determines S5I O whether the output exceeds an initial threshold value, which is stored in the memory 210. When the output does not exceed a threshold value (e.g. the club is not sufficiently tilted), the microprocessor continues to monitor S500 the tilt data. When it is determined that the tilt data exceeds the threshold value, the microprocessor 205 then calculates S515 a percentage value of the tilt data with respect to a maximum value of the tilt data and determines S520 whether this percentage is greater than a threshold value.

When the percentage does not exceed a threshold percentage (e.g. the club is not sufficiently tilted), the microprocessor continues to monitor S500 the tilt data. When it is determined that the calculated percentage exceeds the threshold percentage, the microprocessor writes the percentage to the memory S525.

Referring again to FIG. 4A, the microprocessor 205 determines whether the club is "active" or out of the bag by monitoring the tilt data stored in the memory. As described above, when the microprocessor 205 determines that the calculated percentage exceeds the threshold percentage, the microprocessor writes the percentage to the memory 210. Similarly, the process may be used to determine that the club has been returned to the bag after it has been in an active state. In the case that the club has been active and has been returned to the bag, the tag may send S417 an indication to the location-aware device that the club has been returned to the bag. In the case that this process serves as a determination S415 that the club has been removed from the bag, it acts as a trigger for the tag to wake up, or to start actively processing outputs from other sensors of the tag. The detection of a change to an active state may also result in the microcontroller 205 of tag to control the transceiver 215 of the tag to send S420 an indication to the location-aware device that the club is in an active state or has been removed from the bag. This transmitted information indicates both that the club is now in an active state, and includes a unique ID corresponding to the tag. As discussed above, this unique ID may specifically identify the club, or it may be some other type of ID that is specific to the tag and has previously been correlated with an identification of the club to which it is attached at the location-aware device. The location-aware device may then display an indication to a user that a specific club has been selected for a shot.

Another option for detecting an "at rest" or "active" state of the club is to detect data from a light sensor included in the tag 200. The microcontroller 205 reads S410 the light data stored in the memory 210 and determines that the club has gone from a dark state (e.g. in a golf bag) to a light state (e.g., out of golf bag) when the level of light detected by a light sensor included in the tag 200 exceeds a predetermined threshold.

Figure 6:
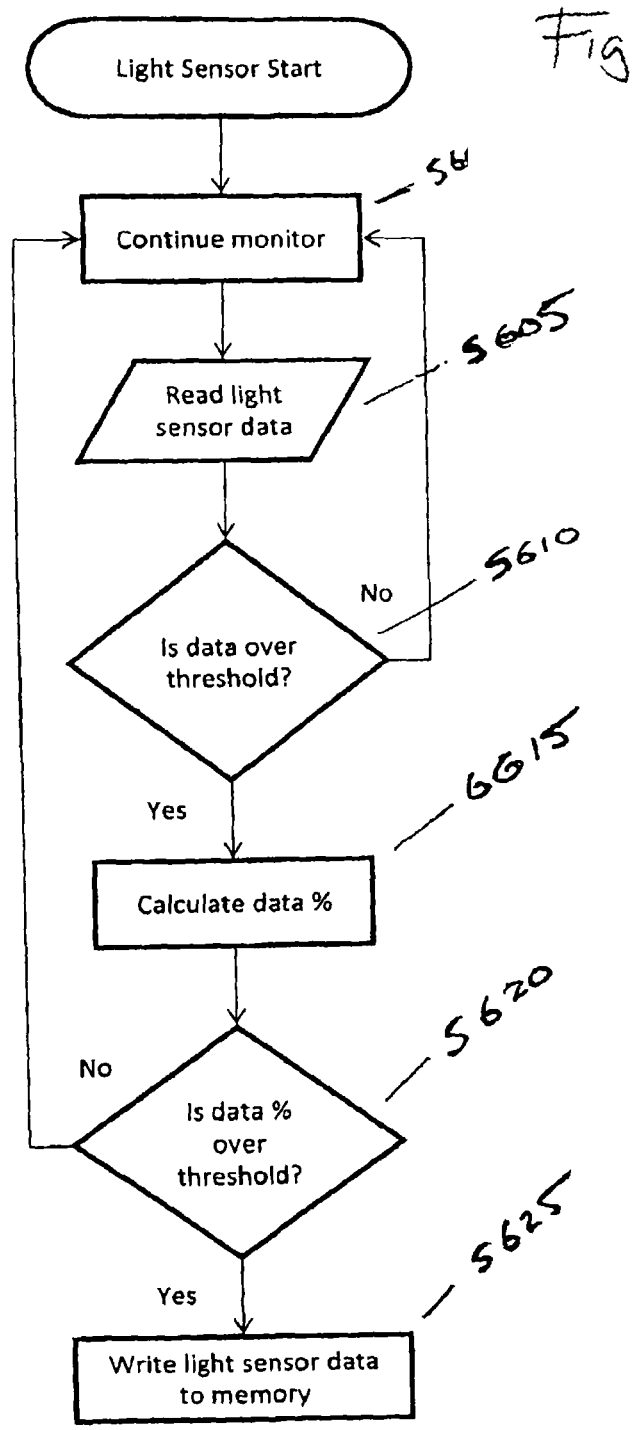
FIG. 6 is a flow chart depicting an exemplary process acquiring and analyzing light sensor data.

An exemplary process flow of acquiring and analyzing the light sensor data is described in the flow chart shown in FIG. 6. The microprocessor reads the light data S605 (e.g., the output of a light sensor 243 included in, or attached to, the tag 200) and determines S610 whether the output of the light sensor exceeds an initial threshold value, which is stored in the memory 210. When the output does not exceed a threshold value (e.g. the club is still in a dark state), the microprocessor continues to monitor S600 the light data. When it is determined that the light data exceeds the threshold value, the microprocessor 205 calculates S615 a percentage value of the light data with respect to a maximum value of the light data and determines S520 whether this percentage is greater than a threshold percentage. When the percentage does not exceed a threshold percentage (e.g. the level of light is not sufficient enough to indicate that the club has been removed from the bag), the microprocessor continues to monitor S600 the light data. When it is determined that the calculated percentage exceeds the threshold percentage, the microprocessor writes the percentage to the memory S625.

Referring again to FIG. 4A, the microprocessor 205 determines whether the club is "active" or out of the bag by monitoring the light data stored in the memory. As described above, when the microprocessor 205 determines that the calculated percentage exceeds the threshold percentage, the microprocessor writes the percentage to the memory 210.

This process serves as a determination S415 that the club has been removed from the bag, and acts as a trigger for the tag to wake up, or to start actively processing outputs from other sensors of the tag. The detection of a change to an active state may also result in the microcontroller 205 of tag to control the transceiver 21S of the tag to send S420 an indication to the location-aware device that the club is in an active state or has been removed from the bag. This transmitted information indicates both that the club is now in an active state, and includes a unique ID corresponding to the tag. As discussed above, this unique ID may be specifically identify the club, or it may some other type of ID that is specific to the tag and has previously been correlated with an identification of the club to which it is attached at the location-aware device. The location-aware device may then display an indication to a user that a specific club has been selected for a shot.

The processes described above of determining if a club is in an "at rest" and "active" state may be used together or individually. For example, the tag may be configured to transition from the "at rest" state to the "active" state by monitoring only the detected light value or the detected tilt of the club. On the other hand, the microprocessor 205 of the tag may monitor both attributes and determine to transition the tag into active mode only after both of the sensed tilt data and light data exceed the threshold value.

Further, as discussed above in each individual example, the detection of a change to an active state may also result in the microcontroller 205 of tag to control the transceiver 215 of the tag to send S420 an indication to the location-aware device that the club is in an active state or has been removed from the bag. This transmitted information indicates both that the club is now in an active state, and includes a unique ID corresponding to the tag. As discussed above, this unique ID may specifically identify the club, or it may some other type of ID that is specific to the tag and has previously been correlated with an identification of the club to which it is attached at the location-aware device. The location-aware device may then display an indication to a user that a specific club has been selected for a shot.

Once the tag is determined to have transitioned into the active state, the microcontroller 205 of the tag reads S425 accelerometer data from memory to determine if a ball strike event has occurred.

Figure 7:
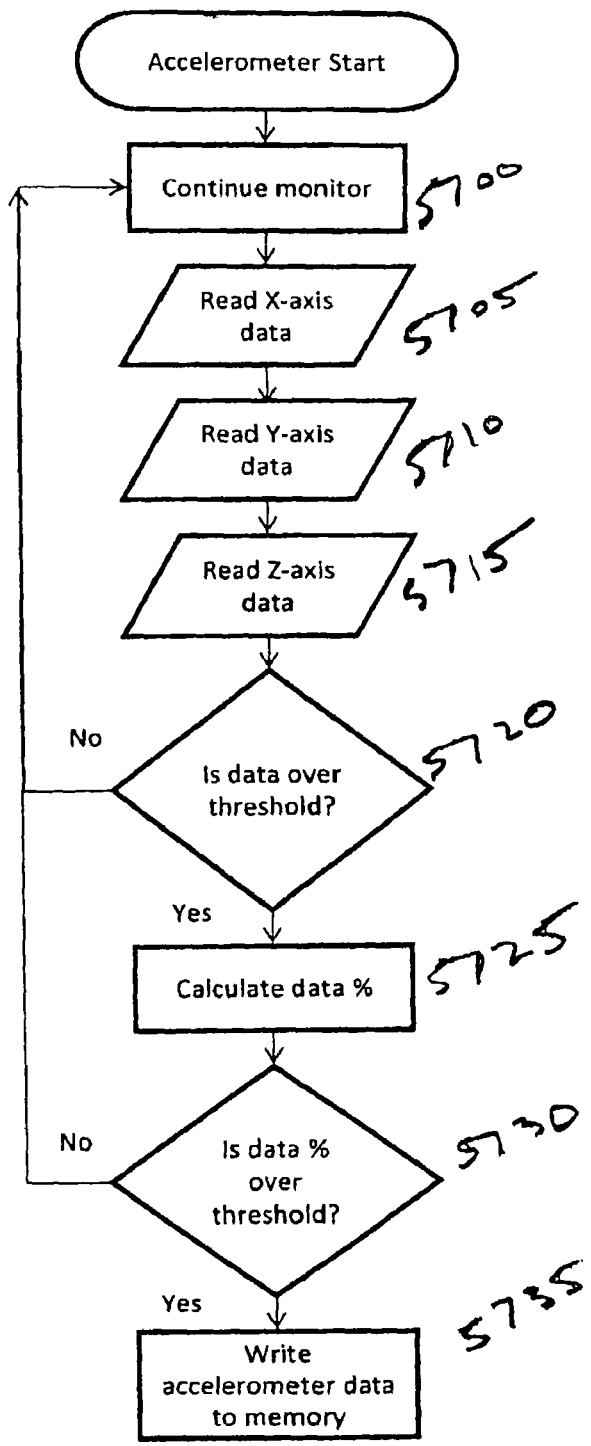
FIG. 7 is a flow chart depicting an exemplary process of acquiring and storing accelerometer data.

An exemplary process flow of acquiring and storing the accelerometer data is described in the flow chart shown in FIG. 7. The microprocessor 205 reads X-axis S705, Y-axis S710 and Z-axis S715 data output from the accelerometer 220. The microprocessor 205 then analyzes the data output from the accelerometer, and determines S720 if the data exceeds a threshold that would indicate a club swing or club swing and ball strike. When the output does not exceed a threshold value (e.g. the data is insufficient to indicate that a swing has been taken), the microprocessor continues to monitor S700 the accelerometer data. When it is determined that the accelerometer data exceeds the threshold value, the microprocessor 205 calculates S725 a percentage value of the accelerometer data with respect to a maximum value of the accelerometer data and determines S730 whether this percentage is greater than a threshold percentage. When the percentage does not exceed a threshold percentage, the microprocessor 205 continues to monitor S700 the accelerometer data. When it is determined that the calculated percentage exceeds the threshold percentage, the microprocessor writes the percentage to the memory S735.

Figure 8:
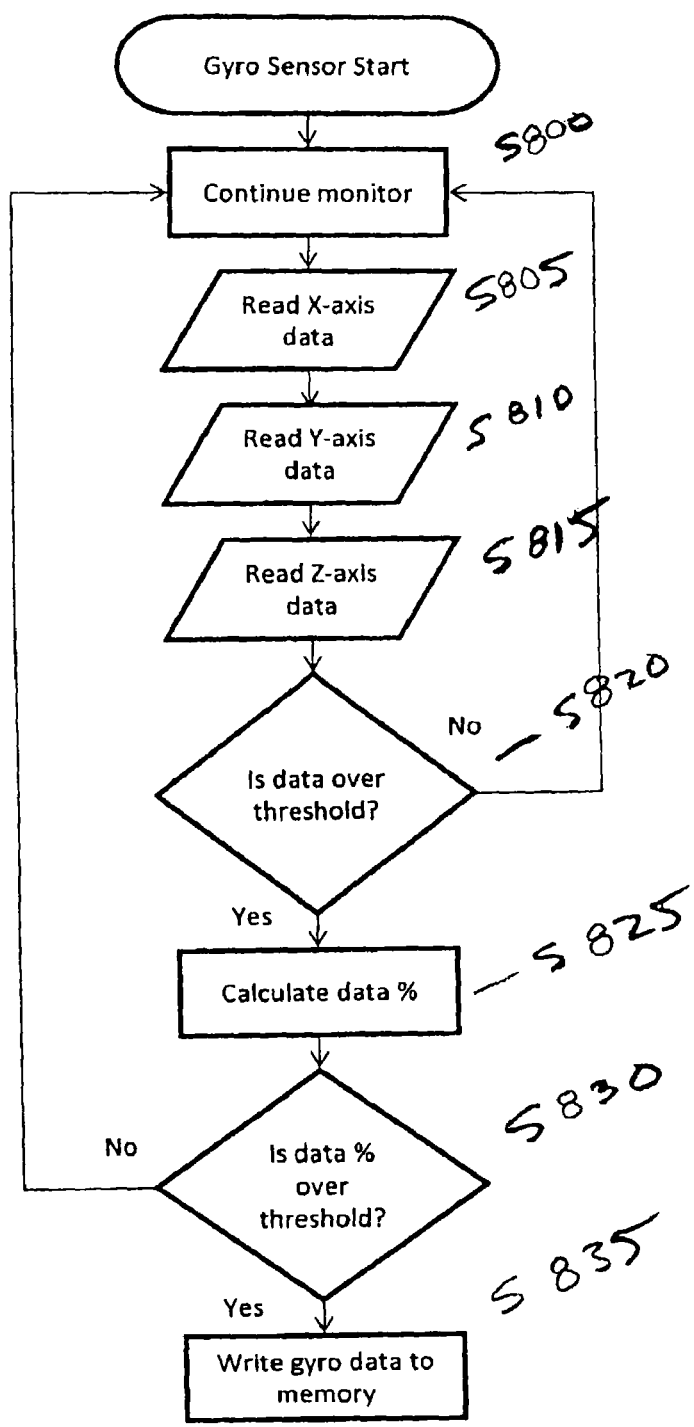
FIG. 8 is a flow chart depicting an exemplary process of acquiring and storing the output from the gyro sensor.

Referring back to FIG. 4B, once the accelerometer data is read by the microprocessor 205, the gyro sensor data is read S430. The process of acquiring and storing the data output from the gyro sensor 235 will be described with reference to FIG. 8.

The microprocessor 205 reads X-axis S805, Y-axis S810 and Z-axis S815 data output from the gyro sensor 235. The microprocessor 205 then analyzes the data output from the gyro sensor, and determines S820 if the data exceeds a threshold that would indicate a club swing or club swing and ball strike. When the output does not exceed a threshold value (e.g. the data is insufficient to indicate that a swing has been taken), the microprocessor continues to monitor S800 the gyro sensor data. When it is determined that the data output from the gyro sensor exceeds the threshold value, the microprocessor 205 calculates S825 a percentage value of the gyro sensor data with respect to a maximum value of the gyro sensor data and determines S830 whether this percentage is greater than a threshold percentage. When the percentage does not exceed a threshold percentage, the microprocessor 205 continues to monitor S800 the gyro sensor data. When it is determined that the calculated percentage exceeds the threshold percentage, the microprocessor writes the percentage to the memory S835.

As noted above, the processes described in FIGS. 7 and 8 indicate how the microcontroller 205 calculates a percentage of an output of each of the accelerometer and gyro sensors relative to a golf swing and stores this data in memory 210. Referring back to FIG. 4B, once this data is stored, the microprocessor 205 reads the data from the memory S425 and S430 to determine whether the golf club is being swung. Similarly to how the tilt and light data are used to determine if the club has been removed from the bag, the accelerometer and gyro sensor data are then used to determine S435 if the club is being swung by the player. If the microprocessor 205 determines S435 that the club is not being swung because percentage data corresponding to one or both of the accelerometer and the gyro is not stored, the process returns to the beginning S400 and the microprocessor continues to determine whether the club is in an active or rest state. If percentage data corresponding to both the accelerometer output and the gyro sensor are stored in memory, the microcontroller determines S440 whether the stored data exceeds a threshold value. If the stored data does not exceed the threshold, the process returns to the beginning S400 and the microprocessor continues to determine whether the club is in an active or rest state. If both of the stored accelerometer percentage and gyro percentage exceed a predetermined threshold value, the microcontroller 205 then reads a stored percentage corresponding to an output of the piezo sensor 230.

In the overall flow of detecting the shot, the piezo data is used to detect the impact of a ball on the face of the club to which the tag is attached. Thus, building on the sensor outputs define above, the flow first determines of the club is in an active or rest state by monitoring data indicating a tilt of the club and/or light data. The process then looks to the accelerometer and gyro sensor data to determine if the club is actually being swung. If the club is active and has been swung, the microcontroller 205 then looks to the output of the piezo sensor to determine if the active and swinging club has made contact with a ball. If so, it is likely that the club has been used to strike a ball.

Figure 9:
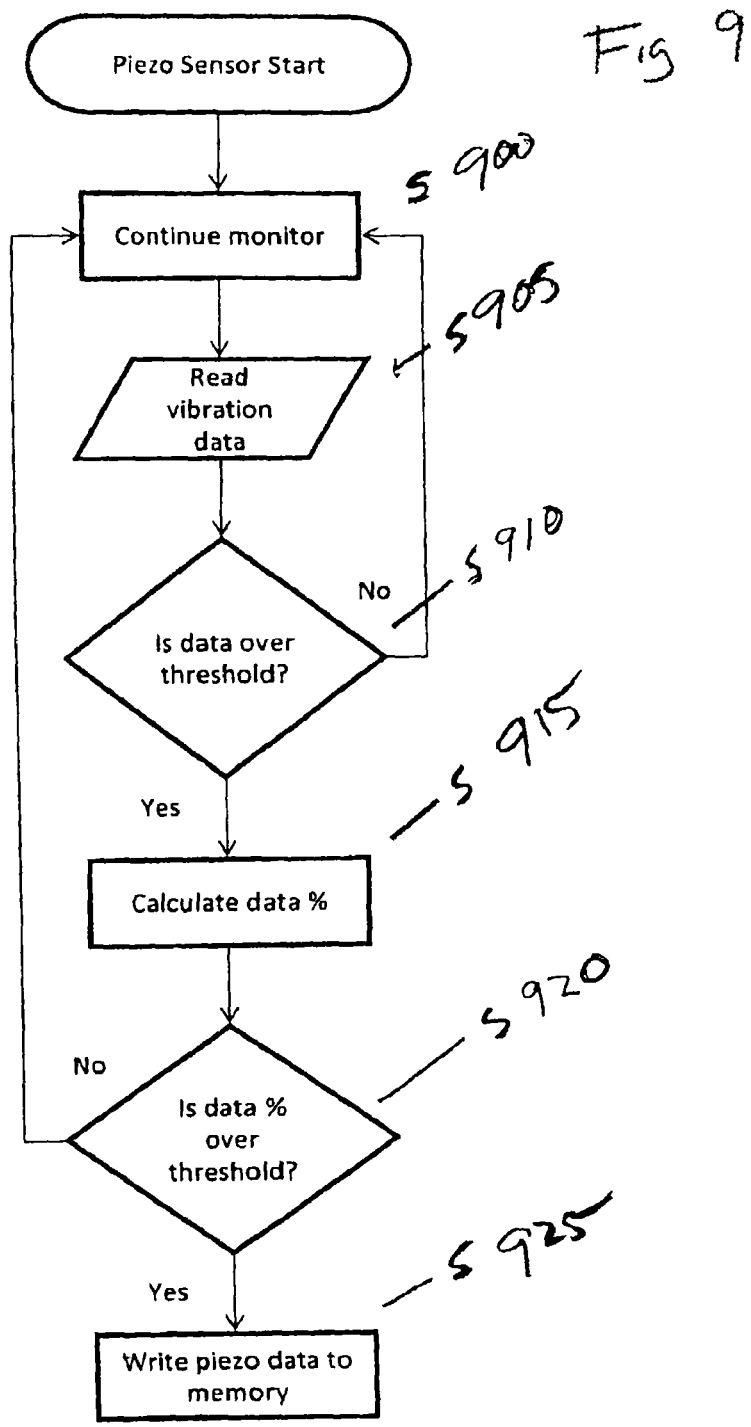
FIG. 9 is a flow chart depicting an exemplary flow of acquiring and storing piezo sensor data.

An exemplary process flow of acquiring and storing the piezo sensor data is described in the flow chart shown in FIG. 9. The microprocessor 205 reads S905 vibration or shock data output from the piezo sensor. The microprocessor 205 then analyzes the data output from the piezo sensor, and determines S910 if the data exceeds a threshold that would indicate a ball strike. When the output does not exceed a threshold value (e.g. the data is insufficient to indicate that the club has impacted a ball), the microprocessor continues to monitor S900 the piezo sensor data. When it is determined that the accelerometer data exceeds the threshold value, the microprocessor 205 calculates S915 a percentage value of the piezo data with respect to a maximum percentage and determines S920 whether this percentage is greater than a threshold percentage. When the percentage does not exceed a threshold percentage, the microprocessor 205 continues to monitor S900 the piezo sensor data. When it is determined that the calculated percentage exceeds the threshold percentage, the microprocessor writes the percentage to the memory S925.

Referring back to FIG. 4B, the microprocessor 205 then determines S450 whether the stored percentage corresponding to the piezo sensor data is greater than a threshold value.

When this value does not exceed the threshold value, the process continues monitoring S400 the tilt and/or light data to determine whether the club has again transitioned into an active state. When it is determined that the stored piezo sensor data percentage exceeds the threshold, the microcontroller 205 then sends S455 the stored percentages related to the piezo sensor data, the gyro sensor data and the accelerometer to the transceiver 215, which then transmits S460 this data to the location-aware device. The transmitted data may also be accompanied with other data such as the identification information corresponding to the tag or club, as discussed above. Once it is determined that the data has been transmitted S465 from the tag to the location-aware device, the process returns to S400 and the microcontroller again starts waiting for a determination that the club has entered an active state.

Figure 10:
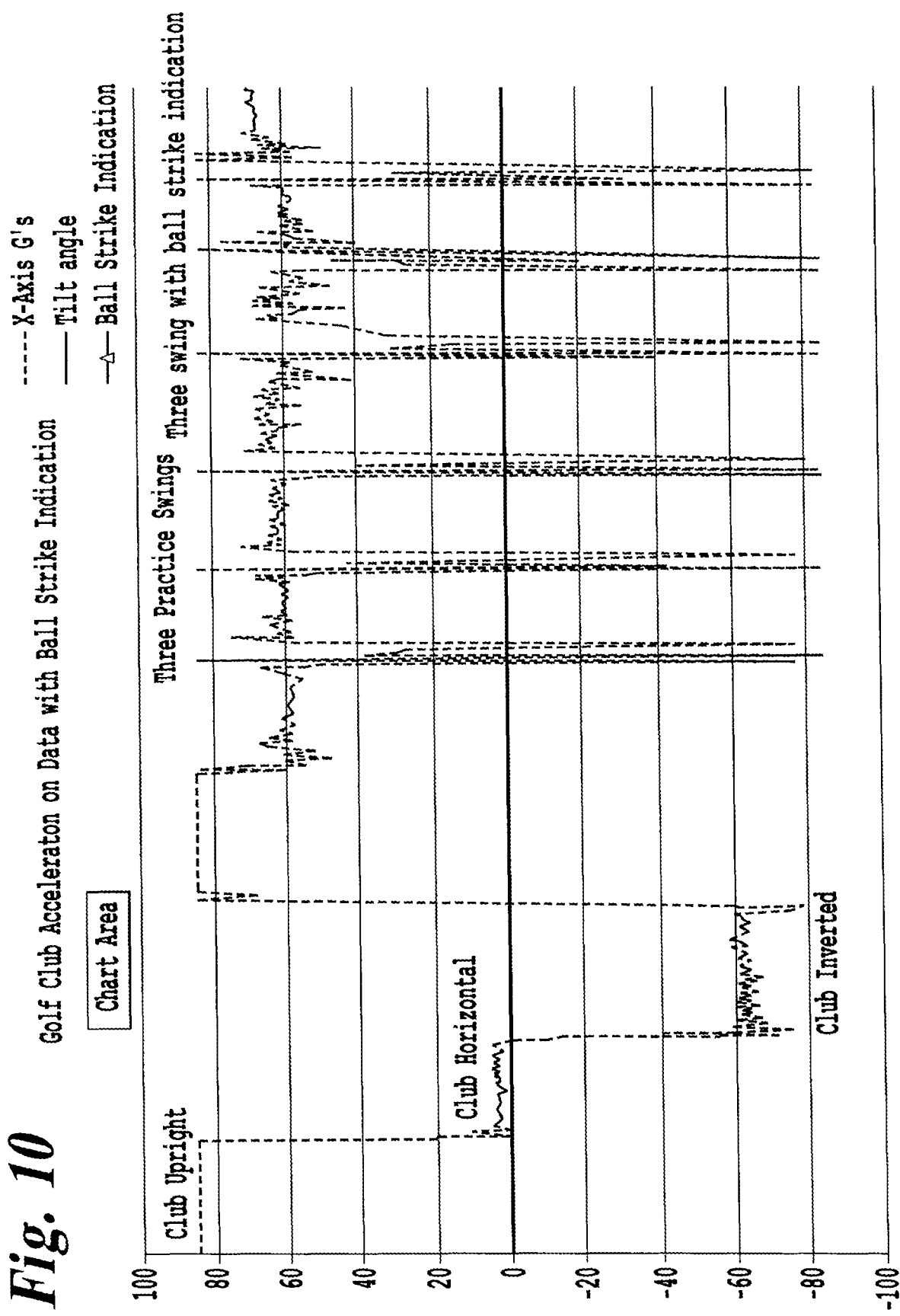
FIG. 10 illustrates exemplary sensor outputs.
Figure 11:
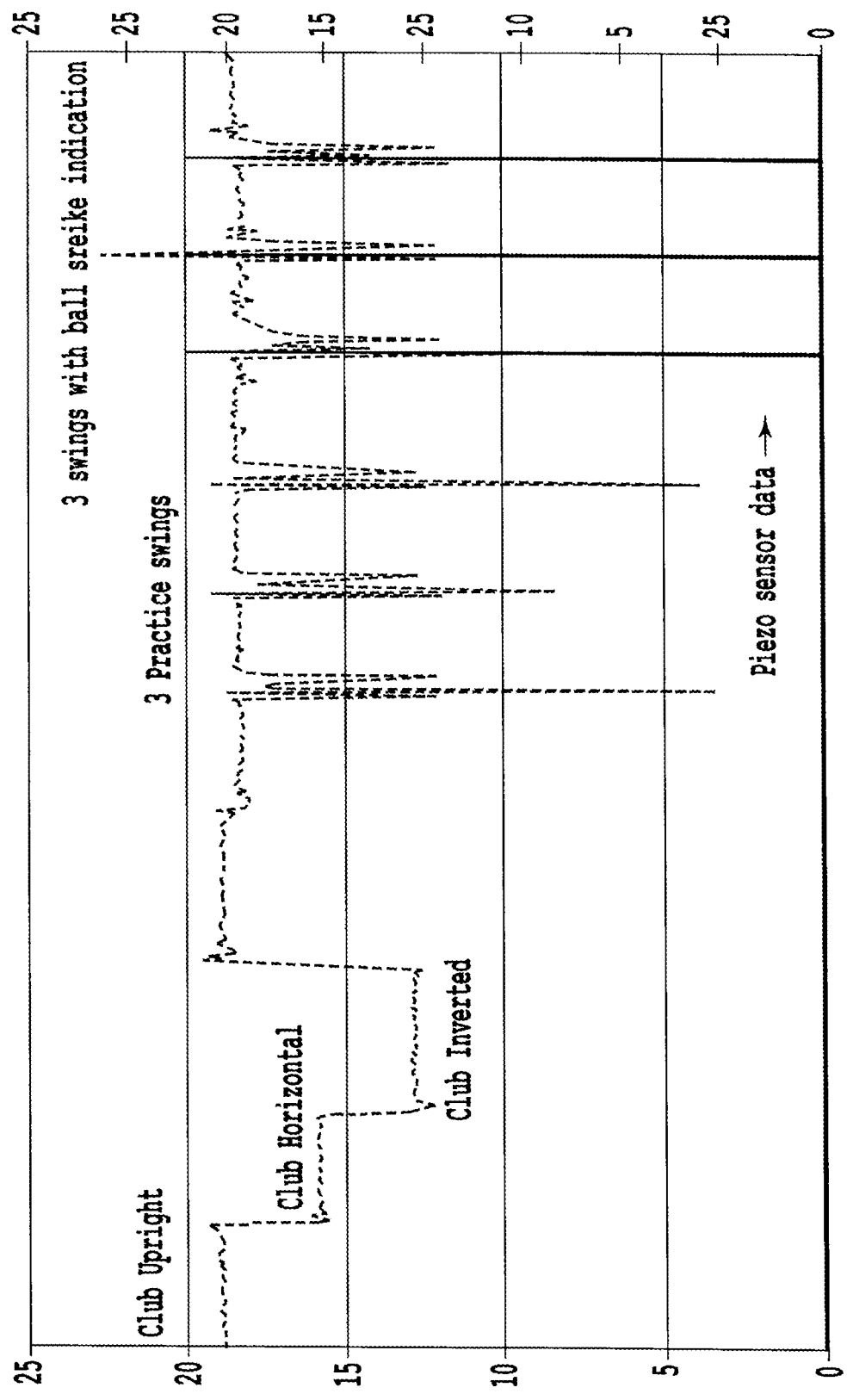
FIG. 11 illustrates exemplary sensor outputs.
Figure 12:
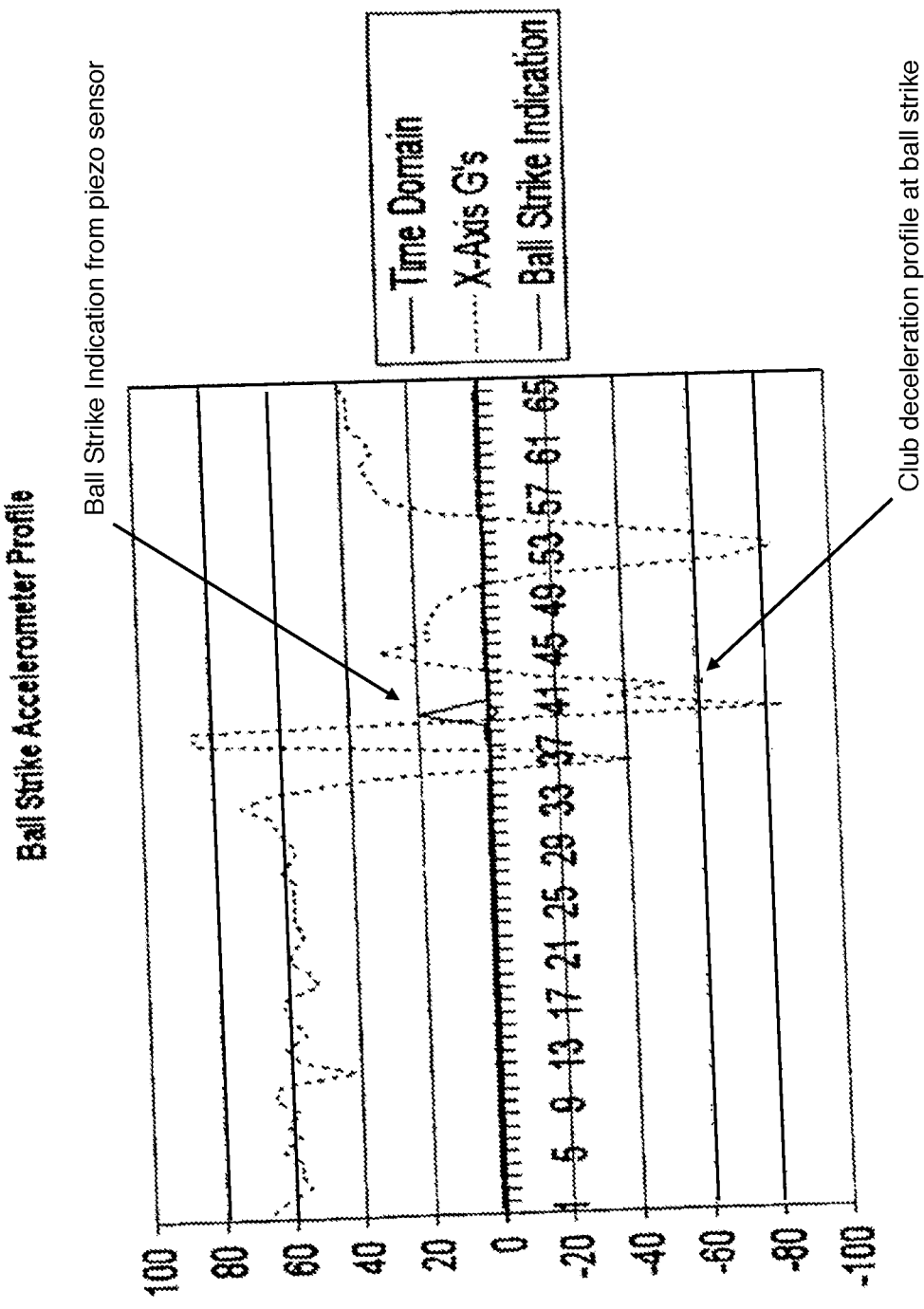
FIG. 12 illustrates exemplary sensor outputs.

FIGS. 10-12 describe exemplary sensor outputs, and the relationship between these outputs and the detection of a shot.

FIG. 10 shows club position as determined by accelerometer X-Axis orientation based on static acceleration (i.e. relationship to gravity when not in motion). Upright club position is determined by approx 1 G, horizontal by 0 G's, and inverted by approx −1 G These scaling factors are adjustable and can be refined with further calibration. Also shown are three practice swings indicated by X-axis dynamic acceleration followed by three swings showing x-axis dynamic acceleration accompanied by a voltage indication from the piezo sensor. The piezo sensor determines a ball strike independently from the accelerometer and outputs a 0 voltage if sensor activity is below the piezo sensor's sensing threshold and it outputs a slight voltage in proportion to the vibration it senses. A microcontroller reads the voltage output from the piezo sensor which can be either analog or digital depending on sensor and circuitry and outputs a logic 0 or logic 1 depending on the voltage thresholds. The accelerometer data and piezo sensor data are transmitted to the location-aware device when they exceed a predetermined threshold as determined by the microcontroller 205 of the tag. As discussed below, the location-aware device determines if a ball strike indication was sent in the same time frame that club acceleration took place and thus validates a ball strike indication. As discussed above, if the microcontroller 205 of the tag determines that there is data output from the accelerometer that exceeds the preliminary threshold data stored at the tag, but the piezo data does not exceed this threshold, then depending on configuration parameters, either no sensor data is transmitted to the location-aware device or the data is transmitted with the intent to provide adaptive feedback to the system to refine processing of data for further events. Once the sensor data has satisfied the initial threshold values at the tag, then the data is transmitted to the location-aware device to allow for a more refined detection as to whether a ball strike even should be registered, as discussed above.

FIG. 11 shows the relationship of club tilt angle to a ball strike. As shown in this figure, the club position data, as indicated by the position data or the gyro data provides a clear indication of a ball strike at a particular time. As shown in the figure, there is a high likelihood of a ball strike when the club is quickly inverted, horizontal, then upright with a piezo output during the upright portion of this sequence.

Further, FIG. 11 also shows how the tag can process tilt information to determine when a club has been removed from the bag. During play, a club stored in the player's bag is typically stored in an inverted (e.g., stored in upright golf bag) or horizontal state (e.g., stored in a bag laying flat). However, when the club is help upright, or when the club transitions between, upright, horizontal and inverted during a shortened time period, there is a high likelihood that this club is now active and is about to be used for a shot.

FIG. 12 shows the relationship of club acceleration to a ball strike indication. It is possible to capture the brief time domain club deceleration due to the club striking the ball. The club acceleration and deceleration profiles would be processed numerically to form data patterns. The data patterns would be used to indicate and/or verify and/or augment other data inputs for a ball strike. An additional benefit of this is to profile a golfer's swing pattern with his own clubs to upload for further analysis.

Figure 13:
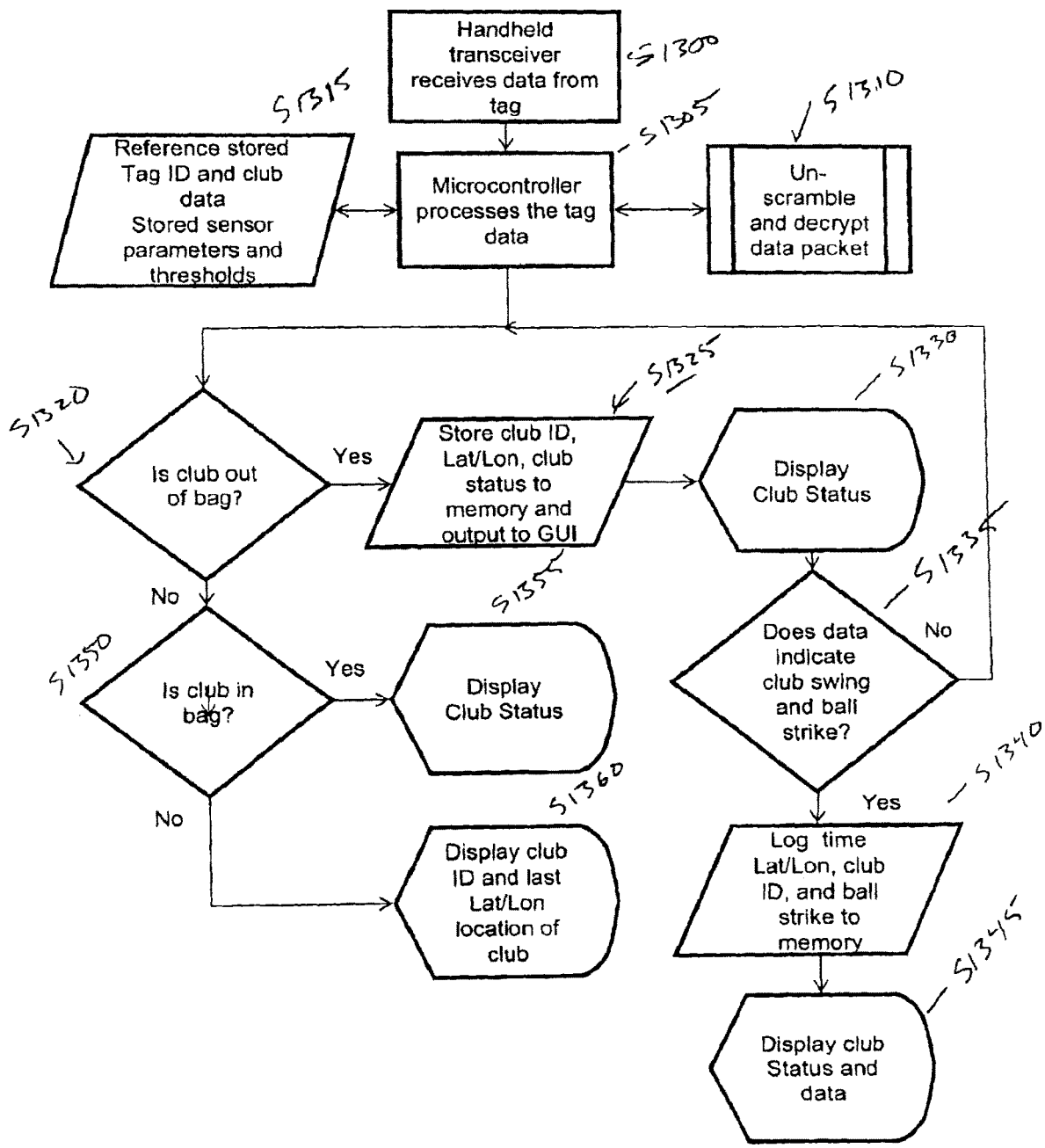
FIG. 13 is a flow chart showing an exemplary process performed by the location-aware device upon receiving data from the tag.

FIG. 13 shows an exemplary process flow of the location-aware device upon receiving data from the tag. The process starts with the transceiver 165 of the location-aware device receiving S1300 the identification information and sensor data from the tag. Upon receiving a transmission from the tag, the microcontroller 105 of the location-aware device processes the received tag data S1305. This process includes demodulating, unscrambling and/or decrypting S1310 the packet data received from the tag.

The location-aware device then references S1315 stored tag ID and club ID information based on ID information received from the tag. As described above, the ID information received from the tag may be specific club identification data (e.g. 5-iron, driver, etc.) or maybe ID information unique to the tag that has been pre-registered in the location-aware device as corresponding to a particular club. This allows the club to which the tag is attached to be identified by the location-aware device for subsequent processing.

The location-aware device also references S1315 stored sensor parameters and thresholds to determine what subsequent steps should be performed based on the received data.

As discussed above, one transmission from the tag may indicate that the club is not in an active state and that the club has been removed from the player's golf bag. The location-aware device determines S1320 that the club has been removed from the player's bag based on the data transmitted from the tag. As discussed above, once the tilt and/or light sensor data indicates that the club is active, the tag transmits an "Out of Bag" message to the location aware-device. Upon receiving this message, the location-aware device may store S1325 the identification of the club in association with a current location of the location-aware device, and output a message S1330 to the player via the GUI of the location-aware device that a specific club or clubs have been removed from the player's bag. The location-aware device then analyzes the data received from the tag to determine S1335 if the sensor data received from the tag indicates that there has been a ball strike.

Some examples of processing the received sensor data are described in greater detail below. The microcontroller of the location-aware device analyzes the received sensor data to determine whether a ball strike event has occurred. Below are specific examples of how the data is processed by the location-aware device to determine whether a ball strike event has occurred. Once the location-aware device determines that a ball strike even has occurred, the location-aware device stores a current location of the ball strike and an identity of the club used for the ball strike event. This information may then be displayed S1345 to a user of the location-aware device as an indication that a stroke has been taken. The GUI may also display information identifying the location of the stroke and update a user's current score for a round of golf based on the detected stroke.

The location-aware device may also receive an indication from the tag that the club has been returned to the bag. This signal could be transmitted from the tag based on a determination that the light sensor has transitioned from a light state to a dark state, or that the club is stored in an inverted position for a predetermined time period after having entered an active state. Obviously a combination of these sensor outputs could be used by the tag to determine that the club has been returned to the bag.

Upon determining S1350 that the signal received from the tag indicates that the club has been returned to the bag, the location-aware device displays S1355 that the club has been returned to the bag.

The location-aware device, however, is also able to determine if a club has been lost on the course by determining that the club has not been returned to the bag after receiving an indication that the club is in an active state from the transmitter. For example, the location-aware device may determine that the device has moved a predetermined distance without receiving an indication that the club has been returned to the bag after being in an active state. Alternatively, the location-aware device may determine that a club indicated as being in an active state has not been returned to the bag after a predetermined period of time from receiving the indication that the club was active. Upon either determination, the location-aware device may initiate a lost club indication and display a message to the player S1360 indicating the position of the course corresponding to the last time the club was activated. The player can then identify where the club was left behind, and retrieve the club.

There are several ways the probability of a ball strike can be described. Ideally this would be configurable to match the golfer or golf clubs used once a profile is established. The probability will be a real number in the range of 0 to 1. As the probability of a ball strike event approaches 100% the greater the possibility the system is detecting a ball strike.

Several examples follow of ways to implement probability to determine a ball strike event based on the fusion of the sensor data. One or multiples of sensors can be included in the implementation. Typically, the more data provided in the system the more accurate the probability will be.

The data below indicates exemplary threshold indications of a ball strike based on the different algorithms if the ball strike % threshold is 75%. The ball strike % threshold is configurable and would be adaptive as the system "learned" the dynamics and sensor indications of a ball strike. This would be implemented by giving the golfer the ability to verify that a golf swing produced a ball strike or did not produce a ball strike. This data would be recorded into memory to help refine and optimize the sensor algorithms over time. This would be an optional input by the golfer.

Terms:
P=Probability
BSE=Ball Strike Event
C=Club Position Sensor Data A=Accelerometer Sensor Data
P=Piezo Sensor Data G=Gyro Sensor Data
Wf=Weighting factor (0 ton)

The first example described below, describes an embodiment in which the microcontroller of the location-aware device processes club position sensor data, accelerometer sensor data, piezo sensor data and gyro sensor data to determine if a ball strike event has occurred. The probability of a ball strike event P(BSE) in this instance can be determined as (P)BSE=(C (% Degrees Up, Down, Horizontal)/Threshold)*(A/A Data Samples)+(P/P Data Samples)+(G/G Data/Samples)/3. Tables 1-4 show exemplary P(BSE) calculations based on this relationship.

TABLE 1

P(BSE) = 100%

| Sensors | Club Position | Accelerometer | Piezo | Gyro |
|---|---|---|---|---|
| Sensor Data | 100 Deg +/- % | 60 | 60 | 60 |
| Sample Rate | 100 Threshold | 60 | 60 | 60 |
| Sensor Data % | 100% | 100% | 100% | 100% |

TABLE 2

P(BSE) = 87%

| Sensors | Club Position | Accelerometer | Piezo | Gyro |
|---|---|---|---|---|
| Sensor Data | 95 Deg +/- % | 55 | 55 | 55 |
| Sample Rate | 100 Threshold | 60 | 60 | 60 |
| Sensor Data % | 95% | 92% | 92% | 92% |

TABLE 3

P(BSE) = 61%

| Sensors | Club Position | Accelerometer | Piezo | Gyro |
|---|---|---|---|---|
| Sensor Data | 85 Deg +/- % | 40 | 50 | 40 |
| Sample Rate | 100 Threshold | 60 | 60 | 60 |
| Sensor Data % | 85% | 67% | 83% | 67% |

TABLE 4

P(BSE) = 40%

| Sensors | Club Position | Accelerometer | Piezo | Gyro |
|---|---|---|---|---|
| Sensor Data | 75 Deg +/- % | 40 | 40 | 40 |
| Sample Rate | 100 Threshold | 60 | 60 | 60 |
| Sensor Data % | 75% | 67% | 67% | 67% |

The second example described below, the probability of a ball strike event P(BSE) in can be determined as (P)BSE=(C (% Degrees Up, Down, Horizontal)/Threshold)+[(A/A Data Samples)+(P/P Data Samples)+(G/G Data Samples))/4. Tables 5-8 show exemplary P(BSE) calculations based on this relationship.

TABLE 5

P(BSE) = 100%

| Sensors | Club Position | Accelerometer | Piezo | Gyro |
|---|---|---|---|---|
| Sensor Data | 100 Deg +/- % | 60 | 60 | 60 |
| Sample Rate | 100 Threshold | 60 | 60 | 60 |
| Sensor Data % | 100% | 100% | 100% | 100% |

TABLE 6

P(BSE) = 93%

| Sensors | Club Position | Accelerometer | Piezo | Gyro |
|---|---|---|---|---|
| Sensor Data | 95 Deg +/- % | 55 | 55 | 55 |
| Sample Rate | 100 Threshold | 60 | 60 | 60 |
| Sensor Data % | 95% | 92% | 92% | 92% |

TABLE 7

| | P(BSE) = 75% | | | |
|---|---|---|---|---|
| Sensors | Club Position | Accelerometer | Piezo | Gyro |
| Sensor Data | 85 Deg +/- % | 40 | 50 | 40 |
| Sample Rate | 100 Threshold | 60 | 60 | 60 |
| Sensor Data % | 85% | 67% | 83% | 67% |

TABLE 8

| | P(BSE) = 69% | | | |
|---|---|---|---|---|
| Sensors | Club Position | Accelerometer | Piezo | Gyro |
| Sensor Data | 75 Deg +/- % | 40 | 40 | 40 |
| Sample Rate | 100 Threshold | 60 | 60 | 60 |
| Sensor Data % | 75% | 67% | 67% | 67% |

The third example described below, the probability of a ball strike event P(BSE) in can be determined as (P)BSE=(C (% Deg Up, Down, Horizontal)/Threshold)*(A/A Data Samples)*(P/P Data Samples)*(G/G Data Samples). Tables 9-12 show exemplary P(BSE) calculations based on this relationship.

TABLE 9

| | P(BSE) = 100% | | | |
|---|---|---|---|---|
| Sensors | Club Position | Accelerometer | Piezo | Gyro |
| Sensor Data | 100 Deg +/- % | 60 | 60 | 60 |
| Sample Rate | 100 Threshold | 60 | 60 | 60 |
| Sensor Data % | 100% | 100% | 100% | 100% |

TABLE 10

| | P(BSE) = 73% | | | |
|---|---|---|---|---|
| Sensors | Club Position | Accelerometer | Piezo | Gyro |
| Sensor Data | 95 Deg +/- % | 55 | 55 | 55 |
| Sample Rate | 100 Threshold | 60 | 60 | 60 |
| Sensor Data % | 95% | 92% | 92% | 92% |

TABLE 11

| | P(BSE) = 31% | | | |
|---|---|---|---|---|
| Sensors | Club Position | Accelerometer | Piezo | Gyro |
| Sensor Data | 85 Deg +/- % | 40 | 50 | 40 |
| Sample Rate | 100 Threshold | 60 | 60 | 60 |
| Sensor Data % | 85% | 67% | 83% | 67% |

TABLE 12

| | P(BSE) = 22% | | | |
|---|---|---|---|---|
| Sensors | Club Position | Accelerometer | Piezo | Gyro |
| Sensor Data | 75 Deg +/- % | 40 | 40 | 40 |
| Sample Rate | 100 Threshold | 60 | 60 | 60 |
| Sensor Data % | 75% | 67% | 67% | 67% |

In the fourth example described below, the probability can be further refined by including weighting factors into the algorithm. The weighting factors can be individually described for each set of sensor data. The probability of a ball strike event P(BSE) in can be determined as (P)BSE=(C (% Deg Up, Down, Horizontal)/Threshold*C Wf)*[(A/A Data Samples*A Wf)+(P/P Data Samples*P Wf)+(G/G Data Samples*G Wf)]/3. Tables 13-16 show exemplary P(BSE) calculations based on this relationship.

TABLE 13

| | P(BSE) = 100% | | | |
|---|---|---|---|---|
| Sensors | Club Position | Accelerometer | Piezo | Gyro |
| Sensor Data | 100 Deg +/- % | 60 | 60 | 60 |
| Sample Rate | 100 Threshold | 60 | 60 | 60 |
| Sensor Data % | 100% | 100% | 100% | 100% |
| Weighting Factor | 1.00 | 1.00 | 1.00 | 1.00 |

TABLE 14

| | P(BSE) = 94% | | | |
|---|---|---|---|---|
| Sensors | Club Position | Accelerometer | Piezo | Gyro |
| Sensor Data | 95 Deg +/- % | 55 | 55 | 55 |
| Sample Rate | 100 Threshold | 60 | 60 | 60 |
| Sensor Data % | 95% | 92% | 92% | 92% |
| Weighting factor | 1.00 | 1.00 | 1.25 | 1.25 |

TABLE 15

| | P(BSE) = 66% | | | |
|---|---|---|---|---|
| Sensors | Club Position | Accelerometer | Piezo | Gyro |
| Sensor Data | 85 Deg +/- % | 40 | 50 | 40 |
| Sample Rate | 100 Threshold | 60 | 60 | 60 |
| Sensor Data % | 85% | 67% | 83% | 67% |
| Weighting Factor | 1.00 | 1.00 | 1.25 | 1.25 |

TABLE 16

| | P(BSE) = 54% | | | |
|---|---|---|---|---|
| Sensors | Club Position | Accelerometer | Piezo | Gyro |
| Sensor Data | 75 Deg +/- % | 40 | 40 | 40 |
| Sample Rate | 100 Threshold | 60 | 60 | 60 |
| Sensor Data % | 75% | 67% | 67% | 67% |
| Weighting Factor | 1.00 | 1.00 | 1.25 | 1.25 |

In the fifth example described below, the probability can be further refined by including weighting factors into the average. The probability of a ball strike event P(BSE) in can be determined as (P)BSE=(C (% Deg Up, Down, Horizontal)/Threshold*C Wf)*[(A/A Data Samples*A Wf)+(P/P Data Samples*P Wf)+(G/G Data Samples*G Wf)]/Avg*Wf. Tables 17-20 show exemplary P(BSE) calculations based on this relationship.

TABLE 17

| | P(BSE) = 100% - Weighting Factor = 1 | | | |
|---|---|---|---|---|
| Sensors | Club Position | Accelerometer | Piezo | Gyro |
| Sensor Data | 100 Deg +/- % | 60 | 60 | 60 |
| Sample Rate | 100 Threshold | 60 | 60 | 60 |
| Sensor Data % | 100% | 100% | 100% | 100% |

TABLE 18

| | P(BSE) = 99% - Weighting Factor = 1.05 | | | |
|---|---|---|---|---|
| Sensors | Club Position | Accelerometer | Piezo | Gyro |
| Sensor Data | 95 Deg +/- % | 55 | 55 | 55 |
| Sample Rate | 100 Threshold | 60 | 60 | 60 |
| Sensor Data % | 95% | 92% | 92% | 92% |

TABLE 19

| | P(BSE) = 69% - Weighting Factor = 1.05 | | | |
|---|---|---|---|---|
| Sensors | Club Position | Accelerometer | Piezo | Gyro |
| Sensor Data | 85 Deg +/- % | 40 | 50 | 40 |
| Sample Rate | 100 Threshold | 60 | 60 | 60 |
| Sensor Data % | 85% | 67% | 83% | 67% |

TABLE 20

| | P(BSE) = 57% - Weighting Factor = 1.05 | | | |
|---|---|---|---|---|
| Sensors | Club Position | Accelerometer | Piezo | Gyro |
| Sensor Data | 75 Deg +/- % | 40 | 40 | 40 |
| Sample Rate | 100 Threshold | 60 | 60 | 60 |
| Sensor Data % | 75% | 67% | 67% | 67% |

Described below are specific examples of P(BSE) calculations for ball strike and/or swing conditions in a real playing environment. These calculations are based on the first example of calculating the P(BSE) using (P)BSE=(C (% Degrees Up, Down, Horizontal)/Threshold)*(A/A Data Samples)+(P/P Data Samples)+(G/G Data/Samples)/3.

The first example shows an exemplary ideal ball strike. In this example, the club is being swung by a player and making full contact with the ball first. Ideally, all the sensor outputs should match the maximum sensor data indicating a full swing with ball impact.

TABLE 21

| | Ideal Ball Strike P(BSE) = 100% | | | |
|---|---|---|---|---|
| Sensors | Club Position | Accelerometer | Piezo | Gyro |
| Sensor Data % | 100% | 100% | 100% | 100% |

The second example shows an exemplary good ball strike. In this example, a ball strike event has occurred, but it is possible that the player did not take a full swing with the club (i.e., the club did not go completely vertical) or the player hit the ground before hitting the ball with the face of the club.

TABLE 22

| | Good Ball Strike P(BSE) = 96% | | | |
|---|---|---|---|---|
| Sensors | Club Position | Accelerometer | Piezo | Gyro |
| Sensor Data % | 100% | 95% | 95% | 95% |

The third example shows the data that indicates a practice swing. In this situation, since the face of the club does not make contact with the ball, the club position, accelerometer, and gyro sensor may indicate a club swing event, but the piezo data is at 0% indicating the club never made contact with the ball. Such an event would likely be detected by the tag, and would prevent the piezo data from being stored at the tag, thus preventing the tag from transmitting any data to the location-aware device. Otherwise stated, since the piezo data is at 0%, the output of the piezo data would not exceed the threshold percentage set by the tag, and thereby not result in an output of data from the tag to the location-aware device.

TABLE 23

| | Practice Swing P(BSE) = 73% | | | |
|---|---|---|---|---|
| Sensors | Club Position | Accelerometer | Piezo | Gyro |
| Sensor Data % | 100% | 95% | 0% | 95% |

The fourth example is the sensor data in the case of a partial practice swing. This situation is similar to the example of the full practice swing in that the piezo data is at 0%. However, in this example, the acceleration data and the gyro sensor are also lower.

TABLE 24

| | Partial Practice Swing P(BSE) = 65% | | | |
|---|---|---|---|---|
| Sensors | Club Position | Accelerometer | Piezo | Gyro |
| Sensor Data % | 100% | 80% | 0% | 80% |

The fifth example reflects the sensor data when the club makes contact with the ground prior to making contact with the ball during a full swing event. Obviously in this scenario a ball strike even should be registered. When the club makes contact with the ground prior to striking the ball, all of the sensor outputs are reduced from that of an ideal shot, but all exceed 80%, for example, thus providing a high probability that a ball strike event has occurred.

TABLE 25

| | Full Swing With Club Hitting Ground Then Ball P(BSE) = 89% | | | |
|---|---|---|---|---|
| Sensors | Club Position | Accelerometer | Piezo | Gyro |
| Sensor Data % | 95% | 80% | 90% | 90% |

The sixth example shows an example of the sensor outputs during a sand shot, in which the sand is impacted prior to making contact with the ball. In this example, the club position, accelerometer and gyro sensors all reflect a full swing, but the piezo sensor data is reduced due to the club impacting the sand before the ball. In this case, a balls strike event should be registered.

TABLE 25

| | Sand Shot P(BSE) = 78% | | | |
|---|---|---|---|---|
| Sensors | Club Position | Accelerometer | Piezo | Gyro |
| Sensor Data % | 95% | 90% | 67% | 90% |

The seventh example shows the sensor data when taking a chip shot or making a partial swing at the ball. Obviously, in this scenario, the accelerometer data will be impacted, but the club position, gyro and piezo data would make up for the deficiency of the accelerometer output. In this scenario, a ball strike event should be registered.

TABLE 26

| Pitch Shot P(BSE) = 76% | | | | |
|---|---|---|---|---|
| Sensors | Club Position | Accelerometer | Piezo | Gyro |
| Sensor Data % | 95% | 60% | 90% | 90% |

Figure 16:
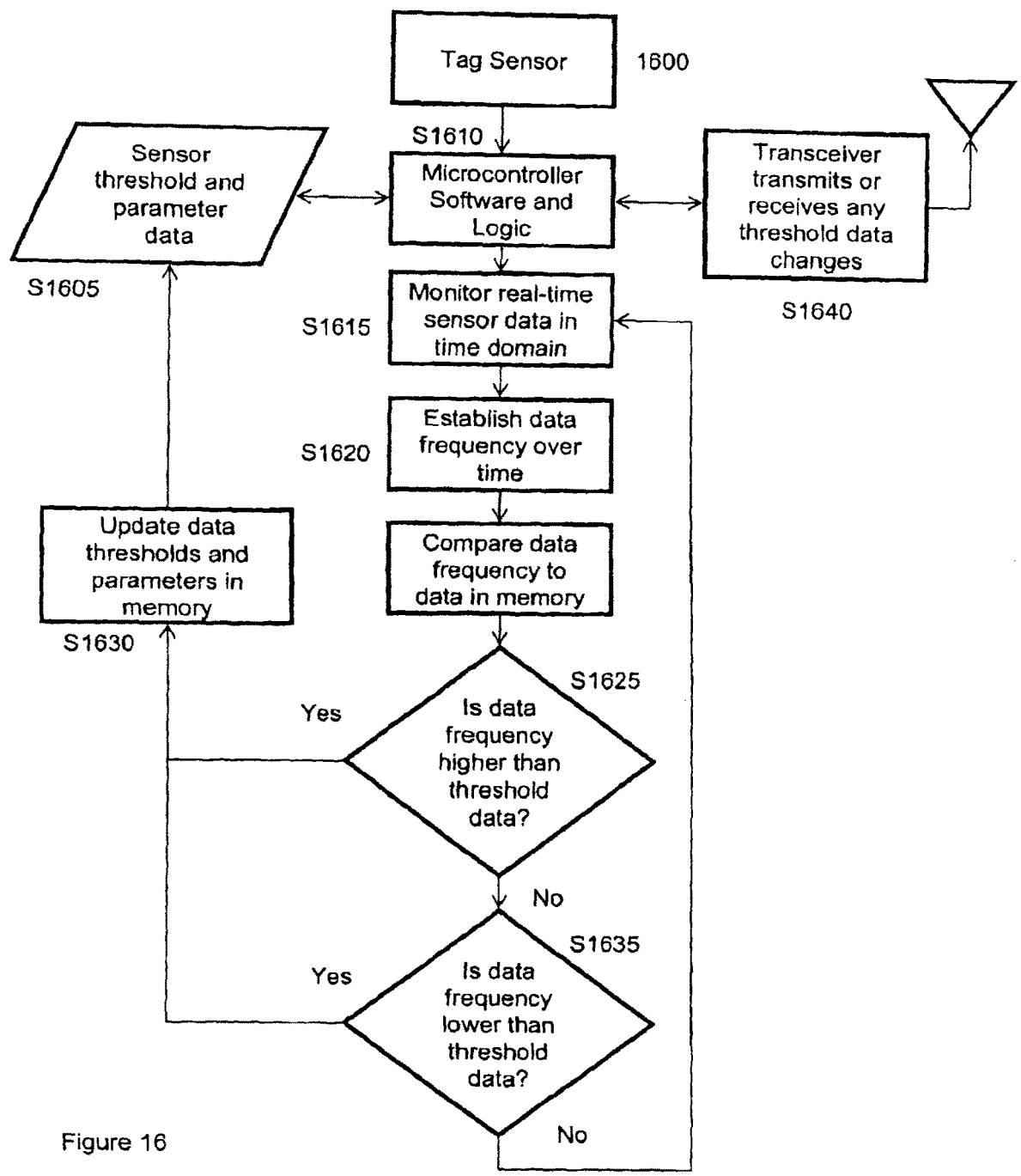
FIG. 16 is a flowchart showing an exemplary adaptive process pertaining to tags.

As discussed above, the thresholds included in the tags and location-aware device may be configured to as to better detect a ball strike event. FIG. 16 describes the adaptive process pertaining to tags.

An advantage of having the ability to have configurable sensor thresholds, parameters and weighting factors in memory S1605 on both the tag 1600 and handheld systems is that it allows for refinement of the sensor data to the characteristics of different clubs and swing patterns. For example, a tag on a driver can have a different sensor processing profile compared to a golf club iron, sand wedge or putter. Each can be configured differently to accommodate the dynamics and characteristics of each club. Likewise, different swing patterns can be accommodated so as to accommodate the difference in the swing profile of a driver compared to a putter. Furthermore, the sensor processing profiles on the tags and location-aware device can be adaptive through active feedback from a user indicating that a shot resulted or did not result in a ball strike or conditions in which the club is or is not in the bag. This feedback would be optionally transmitted to the tag(s) via the transceiver on the handheld device. Additionally, the tags could be self-adaptive in that they could sense sensor noise in the system and adjust their thresholds accordingly or inversely if the sensor input is too strong it could be adjusted down to a more appropriate level.

The sensor thresholds and parameters on the tags primarily act as filters to minimize sensor "noise" from adversely migrating into the sensor data. The tag sensor thresholds and parameters secondarily then act as "tuning" mechanisms to optimize the performance of the sensor with the respective club and thirdly to allow for adaptive tag sensor system optimizations as described above. This is accomplished by the microcontroller software and logic monitoring S1610 the real-time sensor data in the time domain S1615 when the tag sensor is in an active state S1600. The data is processed by using Fast Fourier Transforms (FFT) or other techniques to establish levels of data frequency over time S1620. This data is then compared to the sensor threshold and parameter data in memory S1605 and processed in a logic function S1625 to determine if the frequency of the data is higher than the threshold data in memory. If it is it adjusts the data thresholds and parameters S1630 and updates them into the memory S1605. If the frequency of data is not higher after the comparison then a logic function S1635 determines that it is lower. If it is lower, then the threshold data is modified and updated into memory S1630. If the adaptive process determines no threshold changes are needed, then the system continues monitoring the sensor data S1605 when the tag sensor 1600 is in an active state. The tag transceiver process S1640 transmits any adaptive threshold changes in memory S1605 to the location-aware device's receiver for monitoring in the location-aware device. The transceiver S1640 can also receive threshold and parameter data sent to the tag by the handheld for updating into the tag memory S1605.

Figure 17:
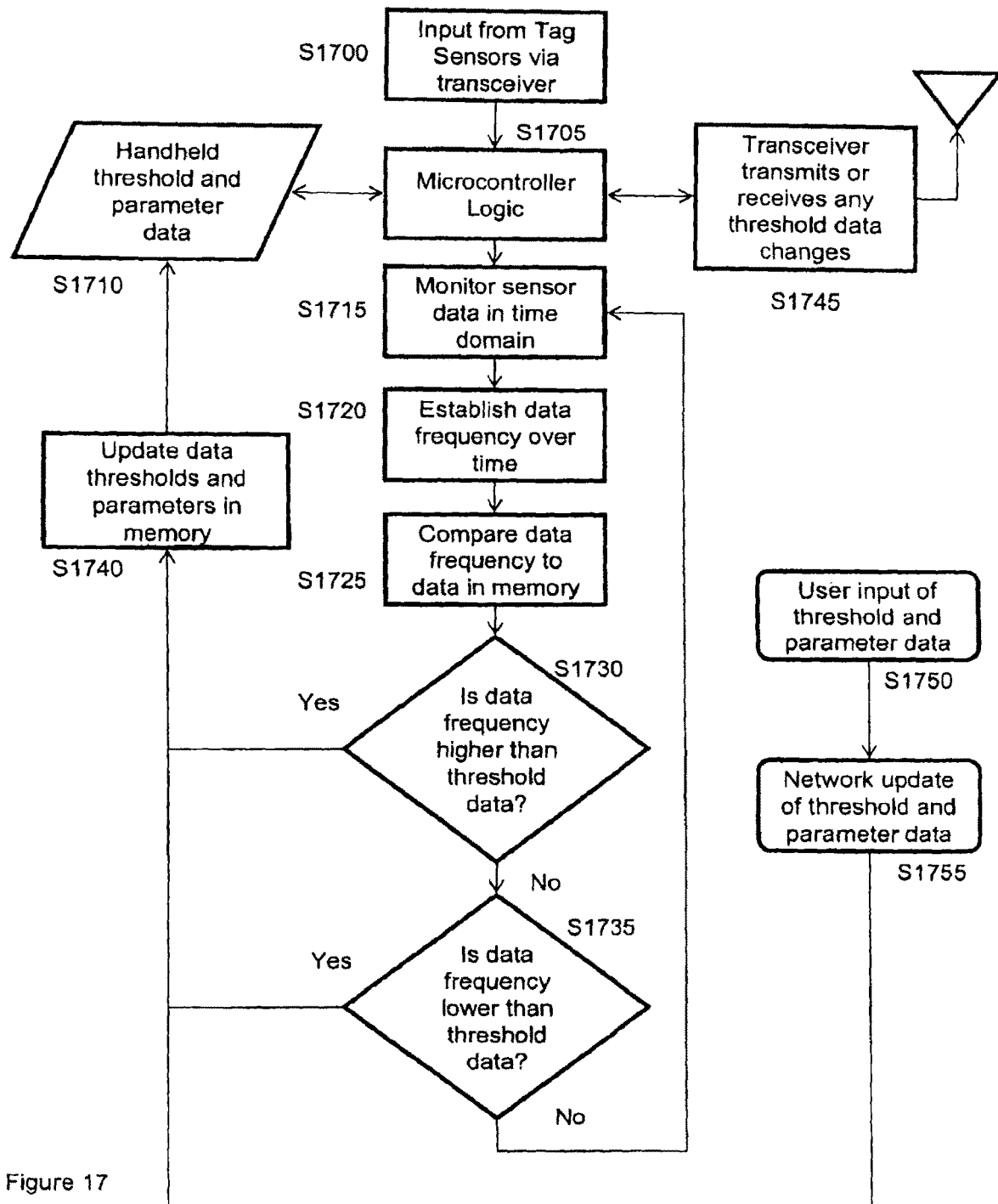
FIG. 17 is a flowchart showing an exemplary adaptive process pertaining to the location-aware device.

As described in FIG. 17, the sensor monitoring thresholds and parameters on the location-aware device allow the location-aware device to make determinations based on the patterns of the incoming tag sensor data S1700 as to whether a certain pattern of data was produced by the golf club striking a golf ball. As on the tags, the location-aware device specific thresholds and parameters can be modified in the handheld memory S1710 to optimize the data for certain club dynamics that may be experienced for example by different golf club types, shafts, materials and manufacturers of clubs, etc. This is accomplished by monitoring the sensor data frequency over time S1715 and establishing a data frequency profile S1720 and then comparing the data frequency profile S1725 to the data thresholds and parameter profiles in the location-aware device memory S1710. The data is processed through logic functions S1730 and S 1735 to determine if the data indicates the thresholds and parameters for determining a club swing and ball strike need to be updated in memory S1740.

It can likewise be adaptive in that the golfer can give active feedback S1750 to the system that an incoming sensor data pattern was or was not a golf shot resulting in a ball strike. Furthermore, it can be adaptive by receiving network updates either via a PC or web function S1755 to update the threshold and parameter data in memory S1710. Over time, the process of analyzing the sensor data patterns can help determine what is "noise" in the incoming data and what is valid data and continually update the thresholds and parameters in memory S1710 as necessary. On both the tags and the location-aware device there would be a set of default thresholds and parameters that the systems could always be reset to in the event of erroneous or corrupted threshold and parameter data in memory.

As described above, the location-aware device 200 is capable of "polling" the tags to determine a status of the tags. This process may be used to determine the status of the battery of each of the tags or may be used to determine whether a tag, more specifically a club corresponding to the tag, is not within a communication distance of the location-aware device. If the tag is not reachable, it may provide an alternative way of determining that the club was left behind on the course.

Figure 14B:
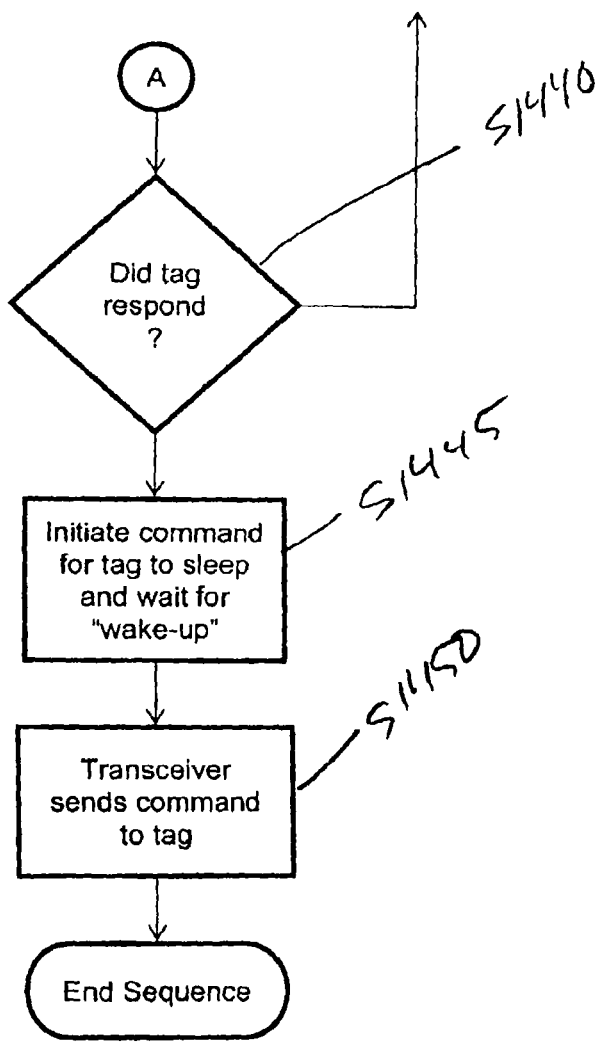

FIG. 14A-14B shows an exemplary embodiment of the process of actively retrieving (e.g., "polling") information from the tags by the location-aware device. Initially, the location-aware device initiates S1400 a request to poll information from the tags, by identifying S1405 the tags associated with the location-aware device. The process of polling information from the tags may be initiated at a predetermined period of time during the operation of the location-aware device, or may be triggered by the failure of the tag to indicate that the club has been rendered at rest (i.e., returned to the player's bag) by sending an indication that the club has been returned to the bag. This is yet another configuration by which the location-aware device may indicate that a club has been left behind by a player by determining that the location-aware device is no longer able to communicate with the tag.

Once the location-aware device determines to initiate a polling request to the tags, the microcontroller sends S1410 a "wake-up" signal to S1415 the transceiver, which transmits the signal to each of the plurality of tags. The microcontroller of the location-aware device then monitors S1420 to determine S1425 if the tags have transmitted a response to the wake-up message. If one or a plurality of the tags has not responded, the location-aware device then transmits S1415 another wake-up command to the tags. As discussed above, if one or more of the plurality of tags have not responded, the location-aware device may display a message to the player via the GUI of the location-aware device. The displayed message may indicate that the tag is unresponsive, thus informing the user that either the battery of the tag is dead, or that the club has been lost or left behind.

Upon receiving a response from the tag, the location-aware device transmits a command to the tags S1430 requesting that the tags transmit its ID and current sensor data. The location-aware device monitors S1435 this subsequent request for information to determine if the tag is unresponsive after the initial request. Upon receiving the initial response to the wake-up command and transmitting the request for the tag ID and sensor data, the location-aware device waits for a response S1435, and determines if the tag responds S1440. If the tag has not yet responded, the location-aware device again transmits the request S1430 for the tags transmit their ID and current sensor data.

After receiving and processing the data from the tag, the location-aware device initiates a command S1445 for the tag to enter, or reenter a sleep state, and transmits this command S1450 to the tag. Optionally the tag can automatically go back into a "sleep" state.

Described below is a modification of the exemplary embodiment of the invention. In this modification, the accelerometer aboard the tag is capable of sensing all the data necessary to detect a ball strike.

Figure 15A:
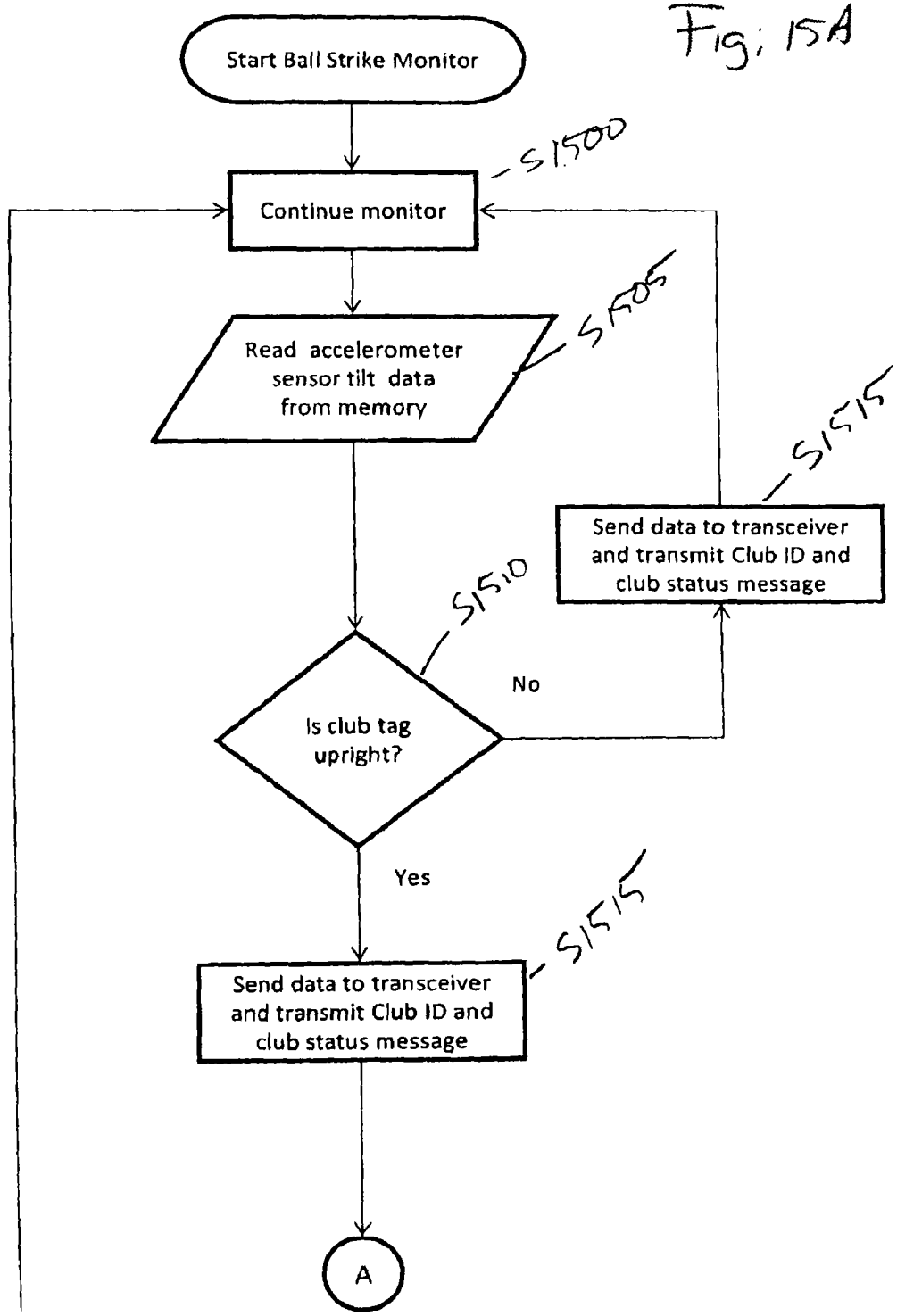
FIGS. 15A-15C is a flow chart showing an exemplary embodiment of a process of detecting a ball strike event using a tag implementing only an accelerometer.
Figure 15B:
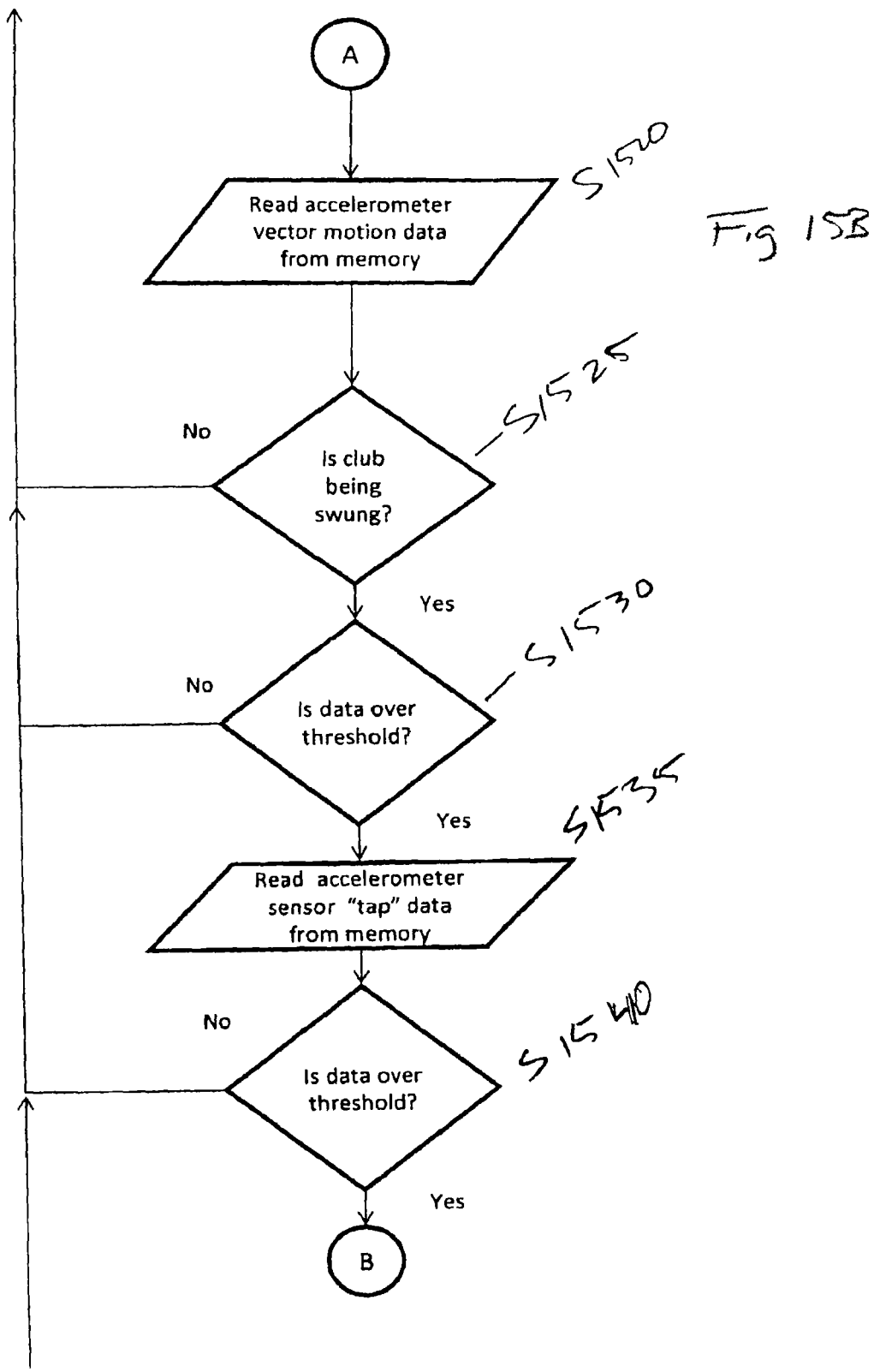
Figure 15C:
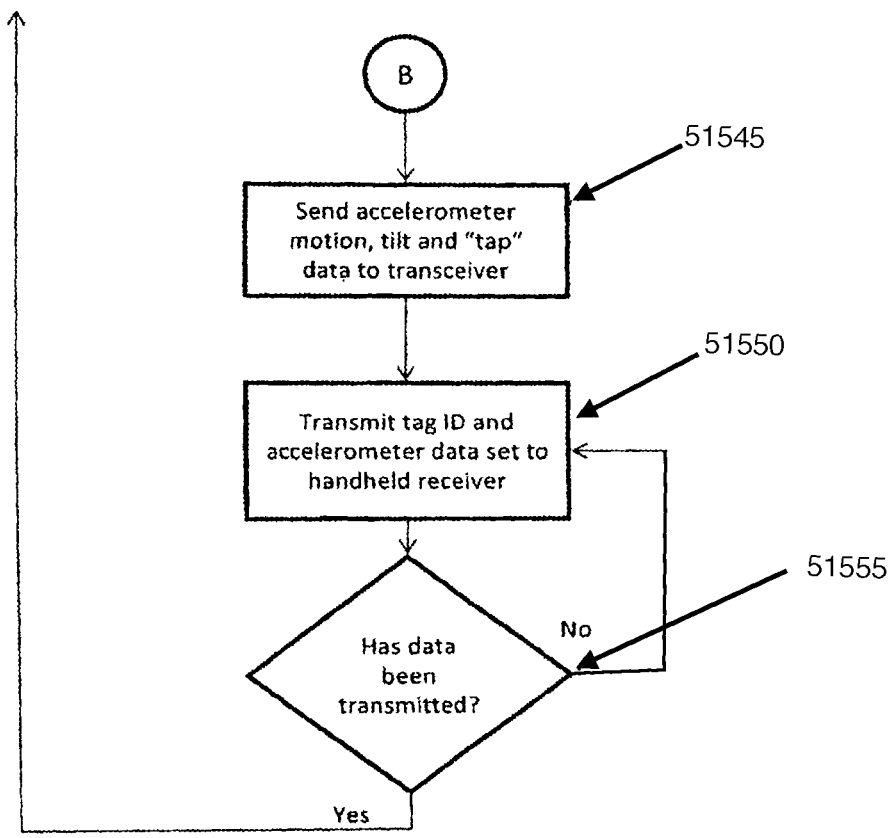

FIGS. 15A-15C disclose an exemplary embodiment of a process of detecting a ball strike event using a tag implementing only an accelerometer.

The process starts at S1500 where the microcontroller 205 of the tag 200 may monitor S1505 a status of the tilt data provided by the accelerometer 220 to determine if the club has been removed from the player's bag by determining if the club has been turned upright S1 S1O, for example. If the club is not upright, the tag continues monitoring S1500 the tilt data to determine if the club has been removed from the bag and should be placed in an active state.

If the club is upright and determined to be in an active state, the microcontroller 205 of tag controls the transceiver 215 of the tag to send S1S15 an indication to the location-aware device that the club is in an active state or has been removed from the bag. This transmitted information indicates both that the club is now in an active state, and includes a unique ID corresponding to the tag. As discussed above, this unique ID may specifically identify the club, or it may be some other type of ID that is specific to the tag and has previously been correlated with an identification of the club to which it is attached at the location-aware device. The location-aware device may then display an indication to a user that a specific club has been selected for a shot.

Once the tag is determined to have transitioned into the active state, the microcontroller 205 of the club reads S1520 accelerometer data from memory to determine if the club is being swung S1525. If the club is not being swung based on the accelerometer data, the tag continues to monitor the status of the club S1500. If the club is being swung, the microprocessor determines if the accelerometer data output exceeds a threshold value S1530. If the data is determined not to exceed the threshold value, the tag continues to monitor the status of the club S1500. If the output of the accelerometer exceeds the threshold value, the microcontroller reads the accelerometer tap data stored in memory S1535 and determines if this data exceeds a predetermined threshold S1540. If the data is determined not to exceed the threshold value, the tag continues to monitor the status of the club S1500. If the tap data exceeds the predetermined threshold, the microcontroller provides S1545 the accelerometer motion, tilt and tap data to the transceiver of the tag, which transmits S1550 the data along with tag ID information to the location-aware device. The tag then determines if the data has not been transmitted S1555. If the data has not yet been transmitted, the process returns to S1550 and transmits the data. If the data has been transmitted, the process starts monitoring the status of the club S1500. The location-aware device then processes the accelerometer motion, tilt and tap data, as discussed above with reference to FIG. 13, to determine if a ball strike event has occurred.

The present invention, therefore, is directed to a process of automatically detecting that a ball strike event has occurred based on sensor data detected by one or a plurality of sensors included in a tag attached to a golf club. The sensor data is initially processed by the tag to determine whether the sensor data indicates that the club has been removed from the bag. Once this determination is made, the sensor data is then initially processed by the tag to determine if the outputs of the sensor data indicate that a ball strike event has taken place. If the outputs of the sensors exceed these preliminary threshold values, the data is then passed onto the location-aware device for further processing to determine if a golf shot should be registered.

Various other advantages are realized by this tag configuration. For example, the configuration allows for the location-aware device to not only detect that a club has been lost, but also displays a location of this lost club to the user.

It should also be noted that the tag system in conjunction with a location-aware device is the preferred implementation of this invention because of the benefits of associating location information with the data, however a handheld, golf cart or golf bag mounted device that has no "location awareness" (i.e. no GPS, inertial systems or other location functions) can still utilize certain features of this system such as the club reminder function of notifying a golfer if he has not returned a club to the golf bag and automated scoring and statistics functions and tag polling functions for club bag inventory. There are many functions that would still be useful even though it would not include the shot latitudes/longitudes or geo-location data. The golfer could still use this system to automatically enter club used and shot data for automated scoring purposes and logging of data and would still have the ability to approximate his shot location and distance manually on a graphic GUI or via a data analysis function on a PC or web-based system.

What is claimed is:

1. A tag, comprising:
   a microcontroller;
   a sensor that, when the tag is physically coupled to a golf club, is configured to output a sensor output signal to the microcontroller based on a detected movement of the golf club; and
   a transceiver, wherein the microcontroller is configured to:
   set, when the tag is physically coupled to the golf club, a sensor processing profile based on physical characteristics of the golf club, the sensor processing profile including profile reference values for each of the plurality of sensors,
   compare the plurality of sensor output signals to the profile reference values in a sensor processing profile to determine whether said sensor output signal is equal to or exceeds predetermined thresholds, and
   control, when said sensor output signal exceeds a corresponding predetermined threshold, the transceiver to transmit data corresponding said sensor output signal to a remote device that is remote from the tag, the transceiver is configured to receive, from the remote device, parameters input to the remote device by a user in response to a display output of the data;

the microcontroller is further configured to adjust the profile reference values according to the update parameters; and wherein said sensor comprises a set selected from one or more of an accelerometer configured to detect acceleration of the golf club, a shock sensor configured to detect a shock imparted on the golf club, a position sensor configured to detect a position of the golf club, a tilt sensor configured to output a tilt sensor output signal based on a detected tilt of the golf club, and a gyro sensor configured to detect an orientation of the golf club.

2. The tag of claim 1, wherein the microcontroller is configured to compare each of a plurality of each of said sensor output signals to stored reference sensor output values.

3. The tag of claim 1, wherein said sensor is an accelerometer configured to detect acceleration of the golf club.

4. The tag of claim 1, wherein said sensor is a shock sensor configured to detect a shock imparted on the golf club.

5. The tag of claim 1, wherein said sensor is a position sensor configured to detect a position of the golf club.

6. The tag of claim 1, wherein said sensor is a gyro sensor configured to detect an orientation of the golf club.

7. The tag of claim 2, wherein the microcontroller is configured to compare an output signal of said sensor in the selected set of the accelerometer, the shock sensor, the position sensor, and the gyro sensor to the stored reference sensor output values corresponding to a ball strike.

8. A golf club impact monitor system comprising:
a microcontroller;
a sensor that, when said sensor is physically coupled to a golf club, each is configured to output a sensor output signal to the microcontroller based on a detected movement of the golf club; and a transceiver, wherein:
the microcontroller is configured to;
set, when the sensor is physically coupled to the golf club and activated by a user a sensor processing profile based on physical characteristics of the golf club, the sensor processing profile including profile reference values for each of the plurality of sensors;
compare said sensor output signals to the profile reference values in a sensor processing profile to determine whether said sensor output signal is equal to or exceeds predetermined thresholds,
control, when said sensor output signals exceeds a corresponding predetermined threshold, the transceiver to transmit data corresponding said sensor output signal to a remote device that is remote from the tag,
the transceiver is configured to receive, from the remote device, parameters input to the remote device by a user in response to a display output of the data; and
the microcontroller is further configured to adjust the profile reference values according to the update parameters;
wherein said sensor provides data indicative of a set selected from one or more of an accelerometer configured to detect acceleration of the golf club, a shock sensor configured to detect a shock imparted on the golf club, a position sensor configured to detect a position of the golf club, a tilt sensor configured to output a tilt sensor output signal based on a detected tilt of the golf club, and a gyro sensor configured to detect an orientation of the golf club.

9. The system of claim 8, wherein the microcontroller is configured to compare each of a plurality of each of said sensor output signals to stored reference sensor output values.

10. The system of claim 8, wherein said sensor is an accelerometer configured to detect acceleration of the golf club.

11. The system of claim 8, wherein said sensor is a shock sensor configured to detect a shock imparted on the golf club.

12. The system of claim 8, wherein said sensor is a position sensor configured to detect a position of the golf club.

13. The system of claim 8, wherein said sensor is a gyro sensor configured to detect an orientation of the golf club.

14. The system of claim 9, wherein the microcontroller is configured to compare an output signal of said sensor in the selected set of the accelerometer, the shock sensor, the position sensor, and the gyro sensor to the stored reference sensor output values corresponding to a ball strike.

15. A method of golf game score keeping comprising:
a microcontroller;
a sensor that, when said sensor is physically coupled to a golf club, each is configured to output a sensor output signal to the microcontroller based on a detected movement of the golf club; and a transceiver, wherein:
the microcontroller is configured to;
set, when the sensor is physically coupled to the golf club and activated by a user, a sensor processing profile based on physical characteristics of the golf club, the sensor processing profile including profile reference values for each of the plurality of sensors;
compare said sensor output signals to the profile reference values in a sensor processing profile to determine whether said sensor output signal is equal to or exceeds predetermined thresholds,
control, when said sensor output signals exceeds a corresponding predetermined threshold, the transceiver to transmit data corresponding said sensor output signal to a remote device that is remote from the tag,
the transceiver is configured to receive, from the remote device, parameters input to the remote device by a user in response to a display output of the data; and
the microcontroller is further configured to adjust the profile reference values according to the update parameters;
wherein said sensor provides data indicative of a set selected from one or more of an accelerometer configured to detect acceleration of the golf club, a shock sensor configured to detect a shock imparted on the golf club, a position sensor configured to detect a position of the golf club, a tilt sensor configured to output a tilt sensor output signal based on a detected tilt of the golf club, and a gyro sensor configured to detect an orientation of the golf club and wherein the number of shots per hole is stored by way of SSID microprocessor.

16. The system of claim 8, wherein the microcontroller is configured to compare each of a plurality of each of said sensor output signals to stored reference sensor output values.

17. The system of claim 8, wherein said sensor is an accelerometer configured to detect acceleration of the golf club.

18. The system of claim 8, wherein said sensor is a shock sensor configured to detect a shock imparted on the golf club.

19. The system of claim 8, wherein said sensor is a position sensor configured to detect a position of the golf club.

20. The system of claim 8, wherein said sensor is a gyro sensor configured to detect an orientation of the golf club.

\* \* \* \* \*